Patented Feb. 2, 1943

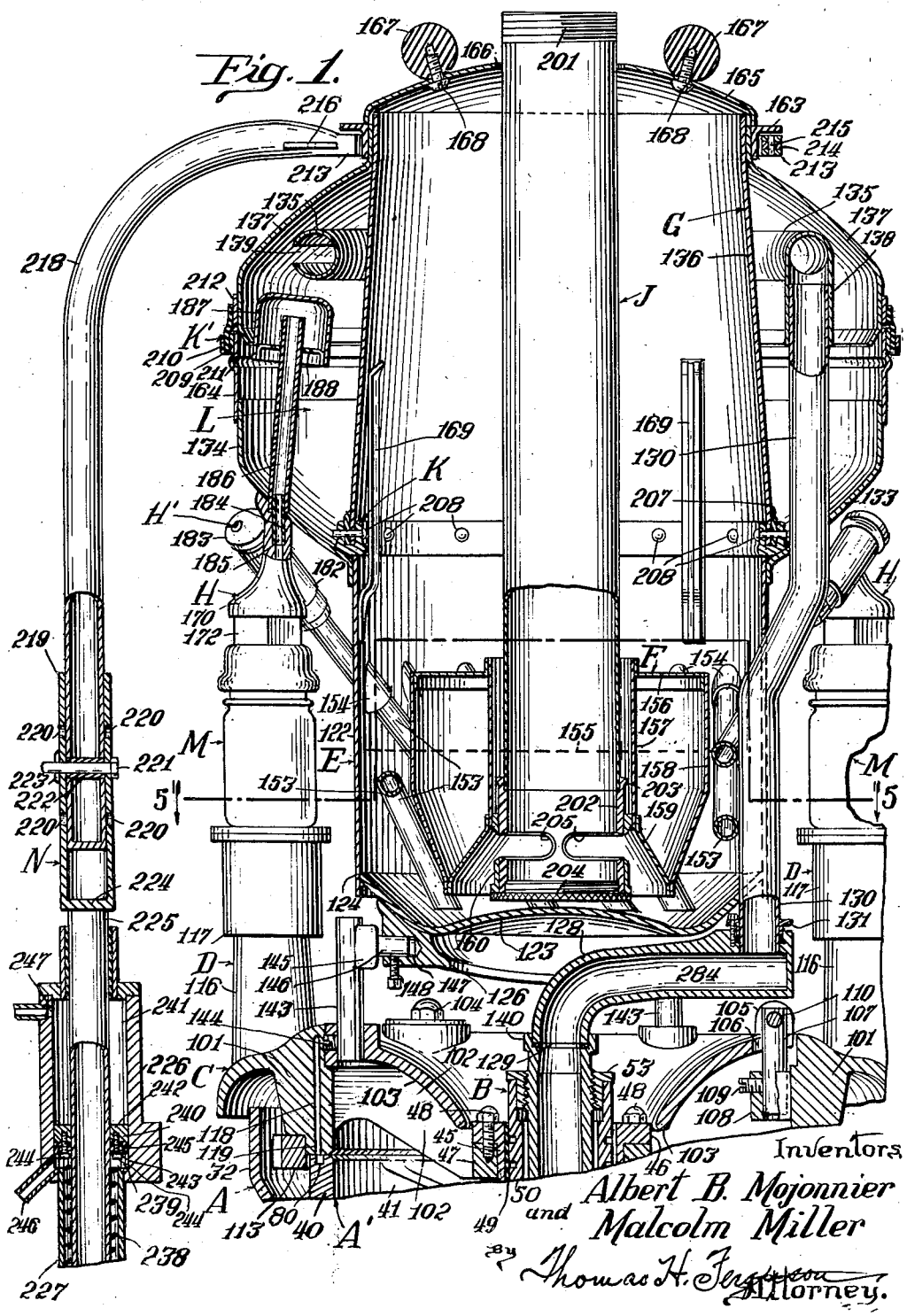

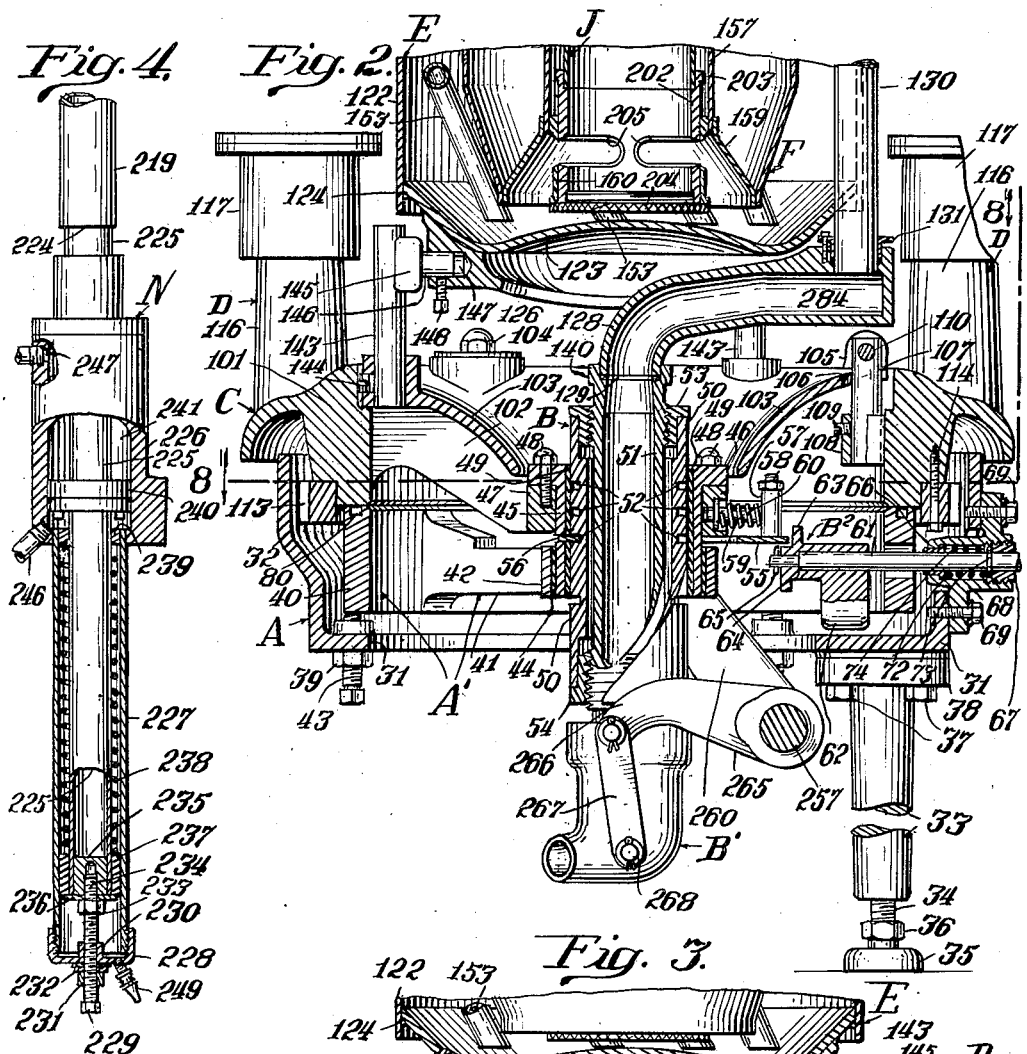
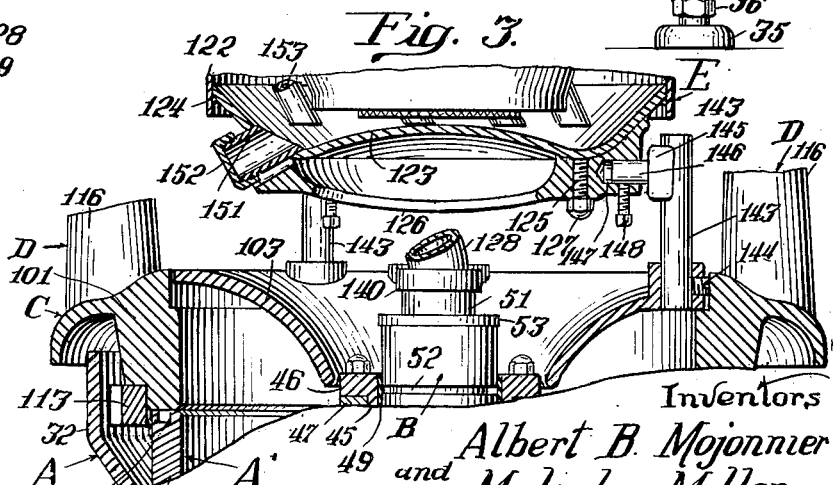

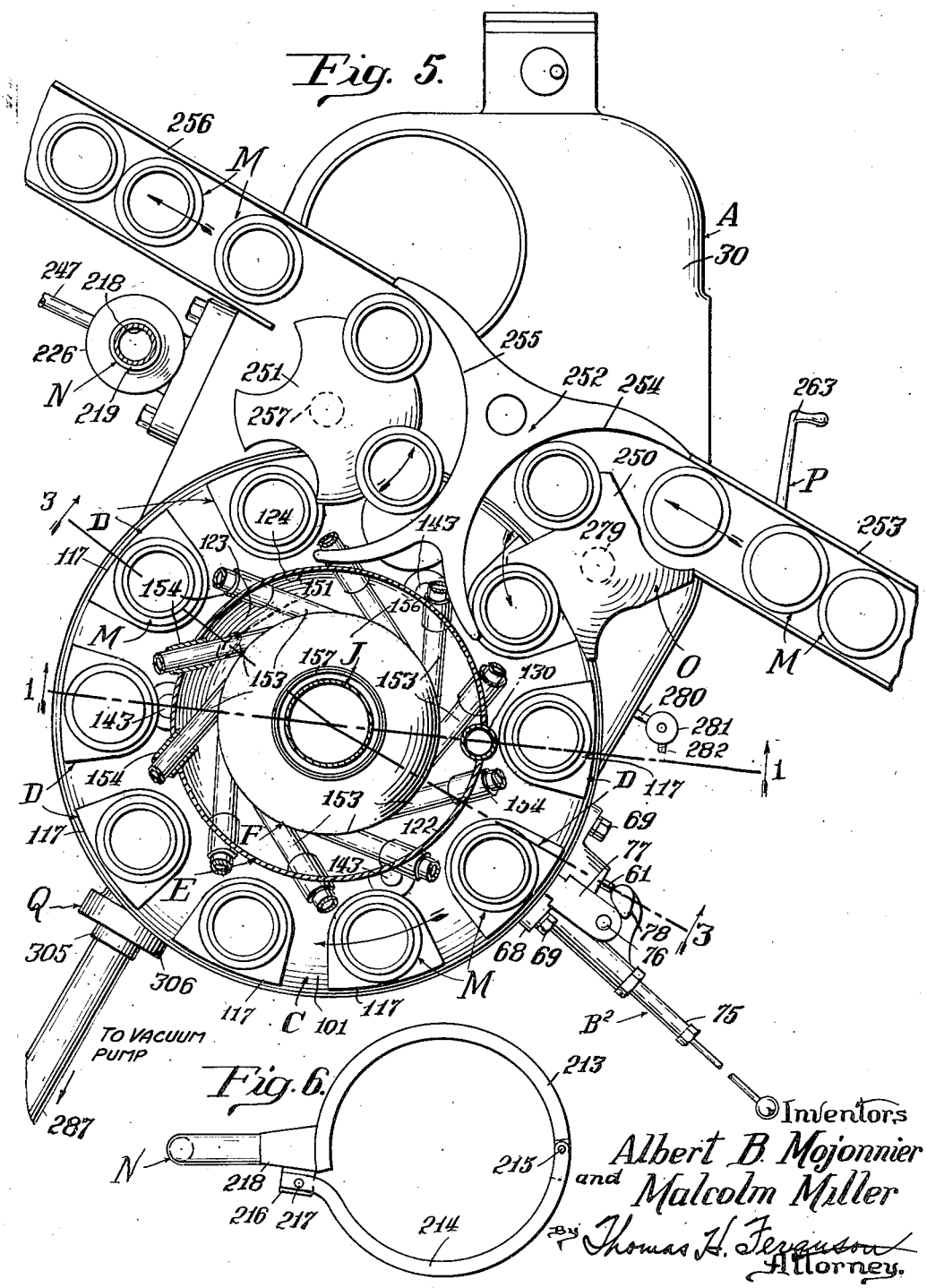

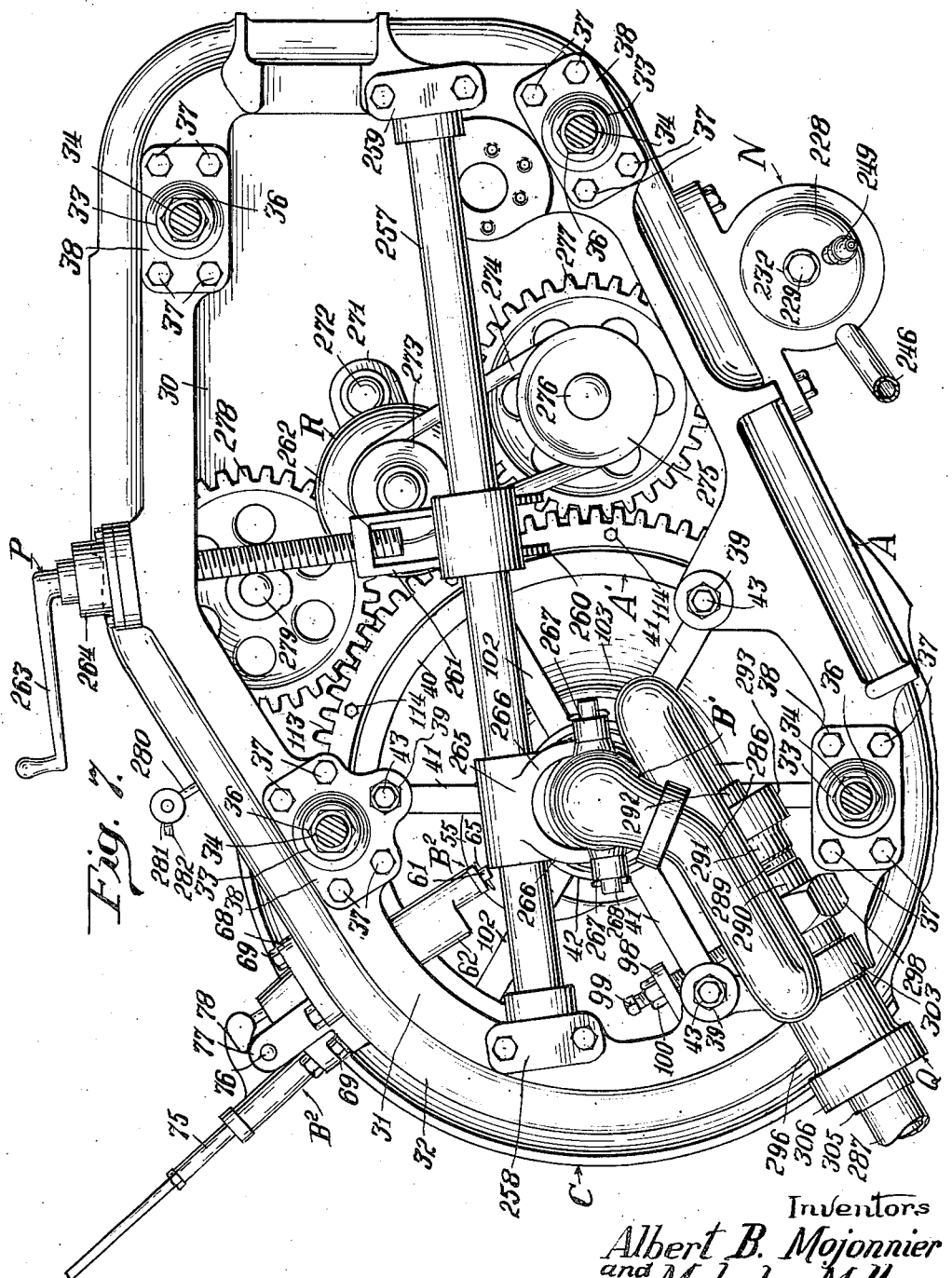

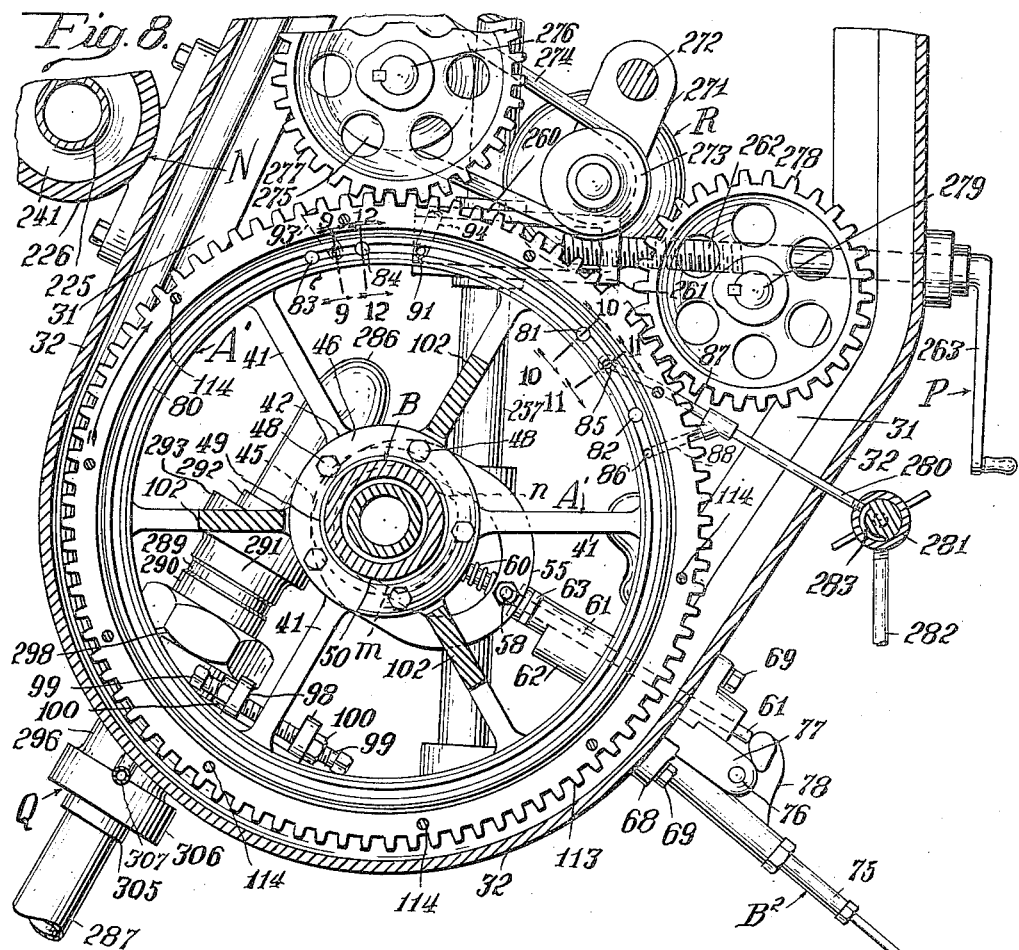
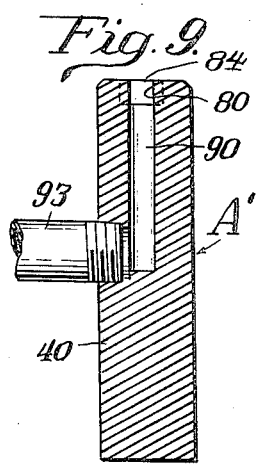
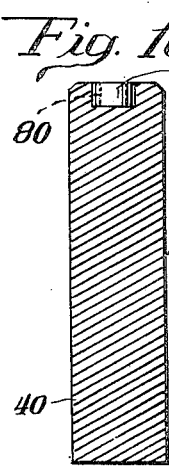
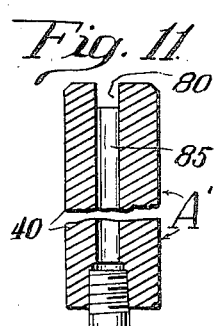
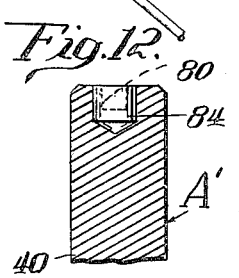

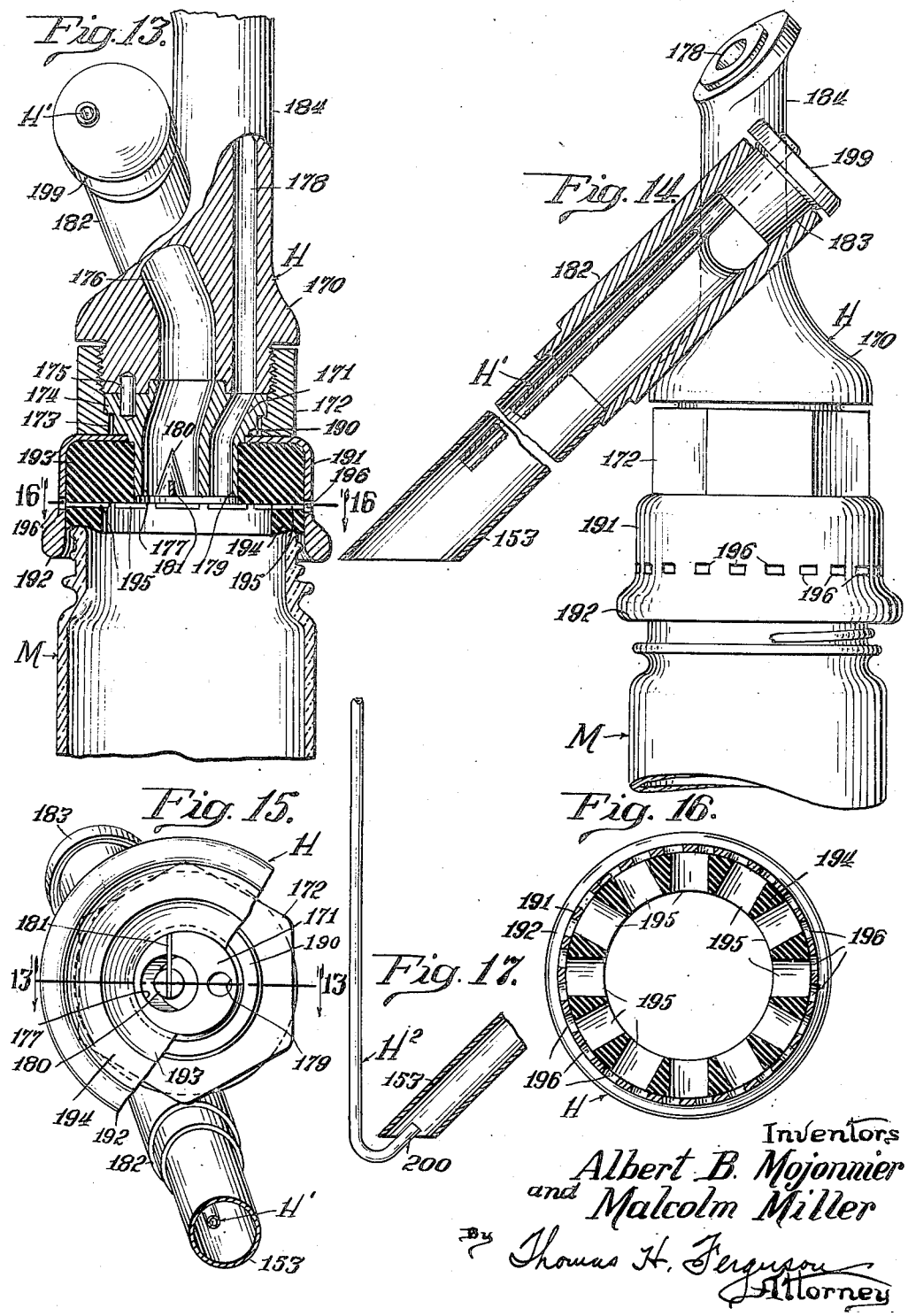

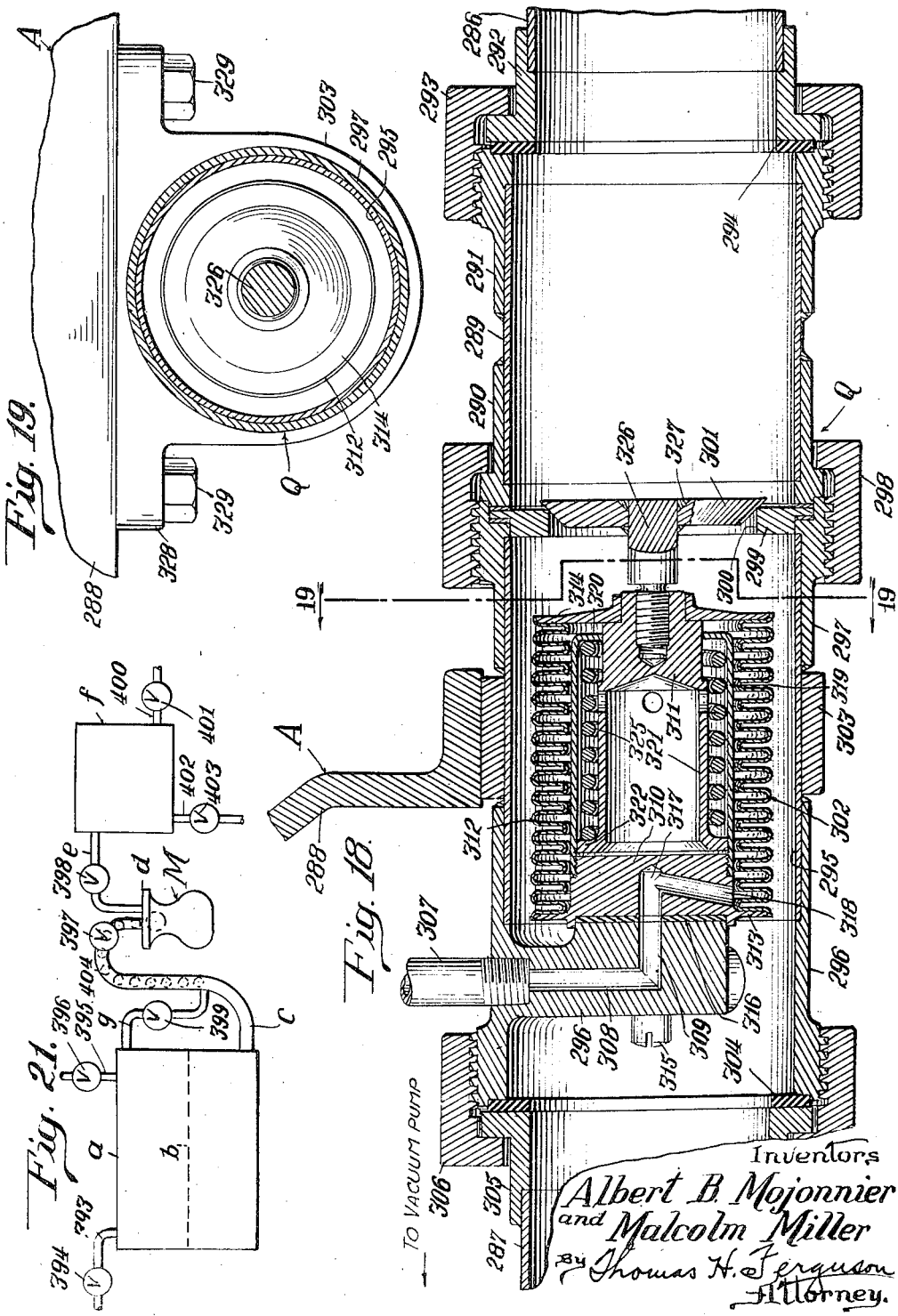

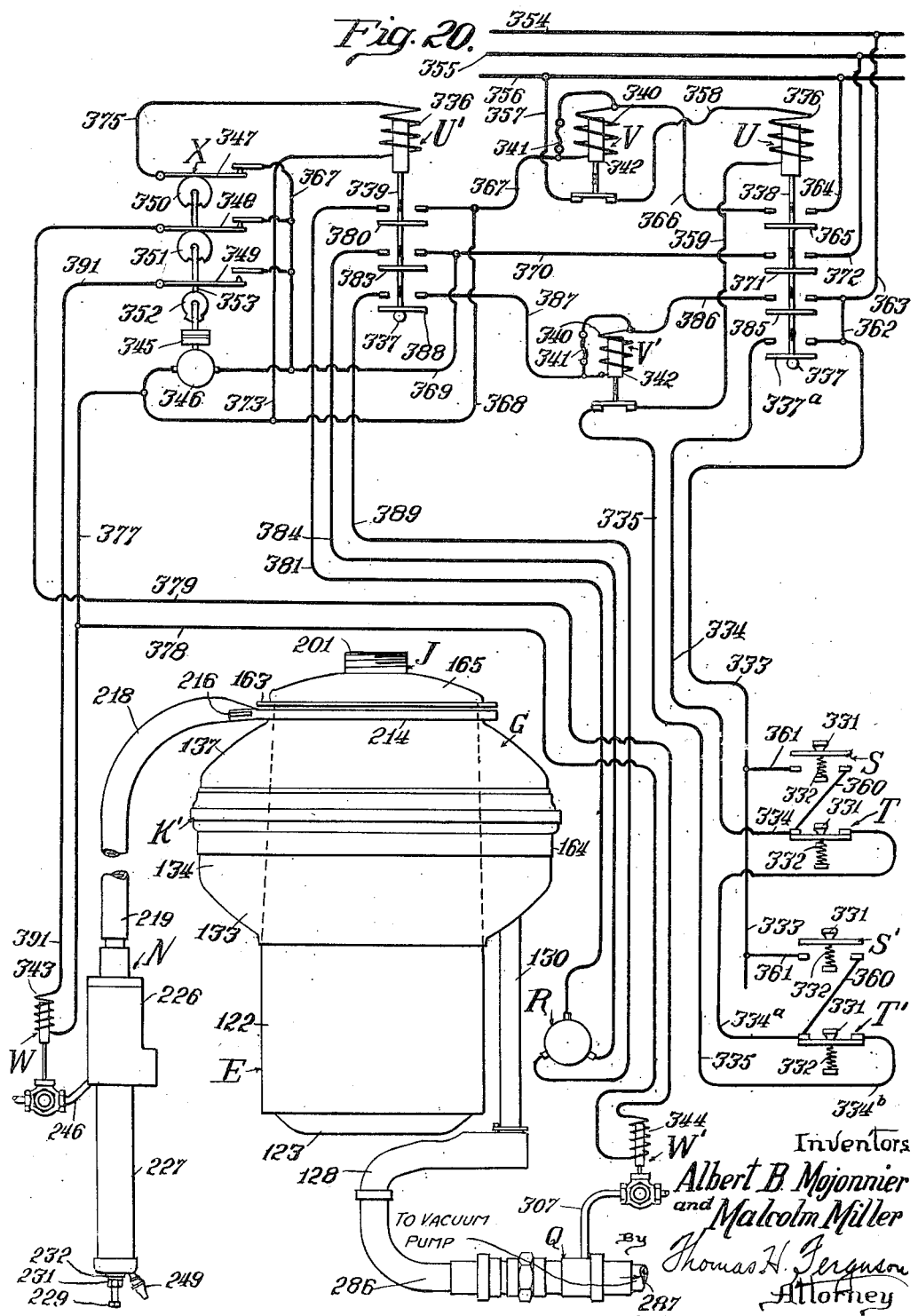

2,309,859

UNITED STATES PATENT OFFICE 2,309,859

ART OF FILLING VESSELS

Albert B. Mojonnier, Park Ridge, and Malcolm Miller, Chicago, Ill., assignors to Mojonnier Bros. Co., a corporation of Illinois Application December 29, 1939, Serial No. 311,542

27 Claims. (Cl. 226—116)

The present invention relates generally to the art of filling containers or like vessels, and comprises a novel filling apparatus. More particularly, the invention has to do with the filling of vessels by what is commonly called the vacuum process, that is to say, that process wherein differences of air pressure are relied upon to convey the liquid substance into the jars, bottles, cans or other vessels, which are to be filled.

The invention is a development starting with the disclosures of two prior United States patents—No. 1,966,889, granted July 17, 1934, and No. 2,147,366, granted February 14, 1939—as a background.

One object of the invention is to provide more particularly for the filling of vessels, whatever their form, with substances that do not flow readily but are more or less viscous in consistency, such as sauces, dressings, pastes, pomade, and the like. Ancillary to this object, is the further object to provide also for the filling of more fluid substances, such as milk and cream. In other words, the invention is intended primarily to provide for filling the heavier liquids, but this is to be done without interfering with its usefulness in the filling of lighter liquids also.

Another object of the invention is to provide for the complete filling of a container without leaving air in the top of the container. Where, as in certain prior practices, a pocket of air is left in the top of the vessel above the substance therein, the latter often is injured in color or taste or both. It is the intent that the vessels be individually filled sufficiently to leave no pockets of air even though the vessels may vary slightly in cubic contents due to variations in size resulting from commercial manufacture, a condition which is commonly met with.

Still another object is to so construct the apparatus that it may be readily cleaned and kept in good sanitary condition, and at the same time be simple in construction and economical to manufacture, use and maintain. Of course, it is also desired to fill the substances rapidly and uniformly without waste and contamination, either by including air as before noted or otherwise.

These and other objects and advantages of the invention will be more fully understood upon reference to the following detailed description, taken in connection with the accompanying drawings, while the scope of said invention will be particularly pointed out in the appended claims.

In those instances wherein mayonnaise is referred to as the substance to be, or being, filled into the containers, it should be understood that the same is merely an illustrative viscous substance. Likewise, where jars are referred to as the vessels to be, or being filled, they, too, are merely illustrative. As before indicated, the invention may be practiced with other liquid substances, both heavy and light, and various other vessels may be used for receiving and holding the substances. The claims should not be unduly limited in this respect.

In said drawings, Fig. 1 is a vertical sectional view of filling apparatus constructed and arranged for the carrying out of the present invention, the same, in itself, constituting a preferred embodiment of the novel apparatus, the plane of section of the main portion of the apparatus being indicated by the line 1—1 of Fig. 5, said figure also illustrating in vertical section a portion of the hoisting mechanism of the apparatus, swung out of its normal position so as to be included in this view; Fig 2 is a vertical sectional view through the lower part of the main portion of the apparatus, the section being taken upon the same plane as Fig. 1; Fig. 3 is another section through the same main portion of the apparatus but taken on a different plane, namely, that indicated by the line 3—3 of Fig. 5; Fig. 4 is a central vertical section of the lower portion of the hoisting mechanism of the apparatus; Fig. 5 is a plan view of the lower portion of the apparatus, parts being shown in section, the position of the view being shown by the section indicating line 5—5 of Fig. 1; Fig. 6 is a plan view of a portion of the pneumatic hoisting mechanism, drawn upon a small scale; Fig. 7 is a plan view of the apparatus, viewing the same from beneath and showing the legs cut off just above their floor-engaging shoes; Fig. 8 is a horizontal section taken near the bottom of the apparatus and showing a portion of the gearing and air channels for supplying compressed air to the lifters and other mechanisms, the plane of section being indicated approximately by the line 8—8 of Fig. 2; Figs. 9, 10, 11 and 12 are transverse sections through air ports and air channels in the stator of the apparatus, the sections being indicated, respectively, by the lines 9—9, 10—10, 11—11 and 12—12 of Fig. 8; Fig. 13 is a vertical sectional view of one of the filling heads in association with a jar top, the plane of section being indicated by the line 13—13 of Fig. 15; Fig. 14 is a side elevation of the same head with the substance supply tube shown in longitudinal section and foreshortened to keep down the size of the figure; Fig. 15 is a bottom plan view of the head with portions of the sealing cushion and its holding ring broken away, said view showing particularly the relative positions of the supply and vacuum ports and the spreading cone; Fig. 16 is a horizontal section cutting through the soft sealing cushion and the peripheral enclosing skirt of the cushion holding ring, the plane of section being indicated by the line 16—16 of Fig. 13; Fig. 17 is a view illustrating a modified air supply tube for admitting air to the advancing stream of substance on its way to the filling head and container; Fig. 18 is a central longitudinal section of a pneumatically operated control valve located in the vacuum supply passage of the apparatus; Fig. 19 is a sectional elevation of the same, the plane of section being indicated by the line 19—19 of Fig. 18; Fig. 20 is a diagram of the electrical control circuits and associated parts by which the proper operation of the apparatus is brought about and controlled; and Fig. 21 is a simplified diagram illustrating particularly how the substance is filled whether employing differential pressures obtained by atmospheric and sub-atmospheric pressures or by pressure differentials produced by other pressures. Throughout these views like characters refer to like parts.

In brief, the method consists in handling the viscous substance to be filled into the vessels, whatever their form, in such a way as to admit small amounts of air, or other gas or gaseous mixture, into a stream of the advancing substance on its way to the vessel to be filled, the admitted gas being at a higher pressure than the air or gas in the vessel. As the gas masses advance, they will remain at the initial pressure until the opposing pressure in the path of travel drops off. This will occur principally when the masses reach the vessel, for therein the air or gas pressure is relatively low. When this point is reached the enclosed gas masses, whether relatively large or small, will expand with a sudden bursting pressure and thus force the adjacent substance outward into the container. Thus, with a succession of substance-enclosed gas globules entering the vessel, the substance is pressed into all parts of the vessel and the latter is completely filled with the substance.

The apparatus for practicing this method may take different forms. Where atmospheric and sub-atmospheric pressures are used to provide the necessary differential pressures for operation, the apparatus consists essentially of suitable vacuum filling elements in association with an air supply channel which is open at one end to atmosphere and at the other end opens into a stream of the viscous material on its way to the vessel, or vessels, being filled.

The commercial apparatus embodying, and for use in practicing, the present invention has been built to operate with atmospheric and sub-atmospheric pressures, and, accordingly, the invention will be particularly set forth by reference to such pressures. And, then, toward the end of the specification, a short explanation will be given, by reference to the diagram of Fig. 21, to show more fully how the necessary differentials may be obtained with other pressures.

In outline, the entire apparatus herein disclosed includes stator and rotor parts, conveying means for feeding vessels to be filled and withdrawing them after they are filled, suction means for drawing the substance through sealing heads into the vessels and excess substance into a vacuum chamber, means for separating the vacuum chamber into parts to thereby allow the excess substance in said chamber to drain back by gravity into the original supply, and controls for bringing about these operations.

The stator includes a base A and a ring-shaped bearing member A' which rests upon the base together with non-rotary parts carried by these. The rotor includes a central column or stem B which extends down through the center of the bearing member A' and rests in a thrust bearing member B' hung from the under side of the base A. The stem B is vertically adjustable with reference to the bearing A' and is held in adjusted positions by suitable latch mechanism $B^2$, associated in part with the column and in part with the bearing. The stem B carries a number of vessel holding and controlling elements which move with the stem. Among these elements are a carrier C, lifters D located upon the carrier, a main tank or holder E in which is located a float valve F, a vertically movable cover G for the tank E, filling heads H carried by and just outward of the main tank and in vertical alinement with the lifters D, there being one head for each lifter, a supply pipe J extending through the cover G down into the main tank E, the tank and cover forming the separable walls of a vacuum chamber L, sealed off by rings K and K'. Traveling with the lifters D are the jars M which are to be filled with the mayonnaise or like substance supplied to the main tank. Another part that is mounted so as not to travel with the rotor, is the hoisting mechanism N by which the cover G is raised and lowered at intervals to allow the excess substance, which is carried over from the jars M and allowed to accumulate in the vacuum chamber L, to drain back again into the main tank E.

In operation, the mayonnaise or like substance, is received from a suitable source of supply into the large central pipe J, and passes down through it into the tank E, the passage being controlled by the float F and its associated valve. Vacuum in the chamber L draws air through the several vacuum passages in the heads H as they reach the proper position in their travel. Thus, taking any one head and its jar, whenever the jar is raised to filling position and properly sealed by contacting the head, the vacuum will drain the air out of the jar. Then through the supply passage in the head H and the associated supply pipe leading from the main tank E, into which tank the mayonnaise has been fed, mayonnaise will be drawn from said tank into the jar. Although we say "draw" or "drawn," when describing this operation of the apparatus, yet, it will be understood that in reality the mayonnaise is forced up from the tank E into the head H and the jar M, by reason of the greater pressure of the air in the tank than in the jar. However, to use the more popular language seems desirable, so we shall continue in that way. Obviously, when the jar is filled, the lifter D withdraws the jar from the filling head H, and thus the vacuum is cut off. The shape of the head H is such that any drippage that forms on it, is drawn up through the vacuum passage into the vacuum chamber L. That mayonnaise which is drawn up into the vacuum chamber as excess, is drained back again into the main tank at regular intervals. This is accomplished by the use of the hoisting mechanism N, which operates periodically. As it rises, it raises the cover G up above, and free from, the tank E, the separation taking place along the lines normally closed by the sealing members K and K'. Obviously, when the tank and cover are separated, there will be no vacuum in the chamber L, and any accumulations of mayonnaise therein will pass over the inclined lower wall of the chamber down into the tank E. The cover G is held suspended long enough to allow for such return of the mayonnaise. Then, the mechanism N lowers the cover G, and the vacuum chamber L is again closed up, and vacuum is again produced therein, to bring about continued suction to fill the jars which are brought into filling relation with the heads H. The duration of suspension of the cover G, although long enough to allow proper drainage of the excess substance into the tank E, is timed in relation to the filling of the jars M so that all jars are completely filled in transit around the apparatus from the feeding-in point to the discharge point. The movement of the lifters D to bring the jars into contact with the heads H, and to remove them therefrom, has to do with this filling operation, as pointed out in the patents previously referred to.

It will be noted that in this case there is no capping mechanism shown and the capping may take place by hand or otherwise as desired.

Bringing the jars M to the carrier C and removing them therefrom after they have been filled, is accomplished by the conveyor O. The parts of this conveyor are very similar to those disclosed in the aforesaid patents. Likewise, there is the adjusting mechanism P by which the rotor of the machine may be raised and lowered. In association with the vacuum supply connection there is also a pneumatically operated valve Q by which vacuum is supplied or cut off according to the running or stopping of the rotor. An electric motor R is also provided for driving the rotor. There are also suitable switches S, S' for starting the apparatus and T, T' for stopping it. In association with these there are the main solenoid switches or contactors U, U', also overload circuit breakers V, V', solenoid valves W, W', and a timer X. All these and the associated circuits cooperate in the control of the apparatus, as hereinafter more fully disclosed.

The equipment which is necessary to the practice of the method is found essentially in the small air supply pipes H', or H², associated with the supply pipes leading from the supply tank E to the several filling heads H. It is by these tubes that the small globules or bubbles, are formed within the mayonnaise, or the like, as it is being sucked up by the vacuum produced in the heads. These, as before noted, explode upon entering the jars and thus complete filling of the jars results.

Referring now more particularly to the details of the apparatus illustrated in the drawings, it will be noted that the base A is a casting of fairly regular outline provided with an upper horizontal floor 30 and a lower horizontal flange 31, both of which extend inward from a more or less vertical peripheral wall 32. The floor 30 extends practically over the entire extent of the base except where it lies beneath the rotor. At that point it is provided with a circular opening for the reception of the rotary elements. The flange 31, on the contrary, extends only a short distance inward from the peripheral wall 32. Obviously, this arrangement might be considerably modified if desired.

This base or frame A is provided in the present instance with four legs 33 which are suitably secured to the lower flange 31 and provided at their lower ends with adjustable leveling screws 34. These screws preferably rest upon floor shoes 35. At their upper ends the screws 34 are threaded into tapped openings in the lower ends of the legs 33. Heads 36, formed upon the screws 34, enable them to be readily turned. By adjusting the screws 34, the position of the foot plates 35 may be varied with reference to the associated legs, and, in this way, irregularities in the floor or foundation upon which the apparatus rests, may be counteracted and the apparatus properly leveled. As clearly shown, particularly in Fig. 7, there is a pair of legs at each end of the base. Suitable screws 37 pass through flanges 38 at the upper ends of the legs 33 into the flange 31 of the frame and thus secure the legs in position.

The bearing member A', located upon the base A, includes an outer rim or ring 40, radial spokes 41 and a hub member 42. The rim, or ring, 40 is carried by the flange 31 of the base A. Interposed adjusting screws 43 furnish the points of support. As in the case of the structure of the aforesaid patents, there are three screws 43 and thus a three-point suspension is provided. Each of the screws 43 is furnished with a lock-nut 39. The bearing A' is held down on the base A, preferably by passing the screws 43 upward into threaded engagement with tapped openings in the under side of the ring 40. As shown, the screws 43 pass through openings in the flange 31. Once the screws 43 are properly positioned, the lock-nuts 39 are set and the adjustment maintained. On the inner cylindrical surface of the hub 42 is a sleeve 44 of suitable bearing metal. This is necessary because the central column B and associated parts rotate within the bearing formed by the hub 42 and the associated bearing metal sleeve 44.

Turning now to the hub structure of the carrier C, it will be seen that the same comprises a bearing sleeve 45, which comes into direct wearing engagement with the fixed wearing sleeve 44, a flange 46 on the sleeve 45 and an associated outer ring 47. The ring 47 is secured in place beneath the flange 46 by screws 48 which pass through the flange into threaded engagement with tapped openings in the ring 47. Just inward of the sleeve 45 is an additional wearing sleeve 49 of suitable metal. The latter sleeve engages the column or stem B. Although the carrier and its hub rotate with the column B, yet the latter is vertically adjustable relative to the former, and, therefore, it is desirable to employ the sleeve 49 of softer bearing material.

Before referring to other parts of the carrier C, it may be well to consider the central column B, especially since it is associated with the hub structure of the carrier, which we have just been considering, and is vertically adjustable relative to the same. Upon examination, it will be noted that the column B includes an outer tube 50 and an inner tube 51. The outer tube has a number of circumferential kerfs or grooves 52 which cooperate with parts of the catch mechanism B² in holding the column in its different adjusted positions relative to the bearing member A' and the carrier C. The two tubes 50 and 51 are secured together by centering bushings 53 and 54, located, the one at the upper end of the tube 50 and the other at its lower end. The bushings 53 and 54 have threaded engagement with the tube 51. They also have shoulders that bear against the ends of the tube 51 when the bushings are screwed home.

From what has been said, it will be seen that the member A' forms part of the stator or fixed part of the machine, while the other parts which are mounted within the hub 42 of the bearing member A' are rotatable and therefore form parts of the rotor. In this connection it should be noted that the column B is not only rotatable with the hub of the carrier C, but it is also capable of vertical adjustments with reference to both the carrier and the bearing member A'.

Turning now to a consideration of the catch mechanism B², by which the column B is held in its different vertical positions, it will be noted that a catch ring 55, carried by and rotated with the hub of the carrier, cooperates with the grooves 52 in the outer tube 50 of the column B to hold the latter in its different vertical adjustments. In order that the catching edge of the ring 55 may reach the grooves 52, it is necessary that the sleeve 45 on that side be provided with a horizontal slot 56. This slot extends about two-thirds of the way around the sleeve, viz., from the point $m$ to the point $n$, as the parts are viewed in Fig. 8. The wearing sleeve 49 is also similarly slotted. It will also be noted that each groove 52 corresponds to a different vertical setting of the column. The ring 55 has a large central opening, as clearly shown in Fig. 8. By horizontal movement the edge of the ring at the left, as the parts are viewed in Fig. 2, may be moved through the slot 56 in sleeve 45, and the corresponding registering slot in the wearing sleeve 49, on into the grooves 52 for the different vertical settings of the column. These vertical adjustments are made for the purpose of raising the upper portion of the rotor to different elevations relative to carrier C, and thus to suit the apparatus to operating with jars, or other receptacles, of different lengths. Obviously, a suitable number of grooves 52 should be provided to care for all the different settings which may be required in service.

It will be noted that the catch ring 55 is provided with a block 57 which is suitably secured to the ring, preferably by one or more bolts 58, having suitable nuts, as shown in Fig. 2. The block 57 is radially apertured for the passage of a rod or stem 59 which is firmly seated and retained at one end within a recess formed within the ring 47. A compression spring 60 acts between the block 57 on the one hand and the ring 47 on the other hand, to move the catch ring 55, to which the block 57 is fixed, into groove engaging position. Such a position is illustrated in Fig. 2. As before noted, the ring 55 and the associated parts rotate with the hub of the carrier during the normal operations of the apparatus. Since this is so, some special provision must be made for actuating the ring when it is desired to change the vertical adjustment of the column B.

For the purpose of actuating the catch ring 55 from the outside of the machine, it will suffice to locate actuating mechanism at one point in the stator and, then, when the rotor is stopped, move it by hand until the appropriate part of the catch ring 55 is in position to be actuated by the non-rotating control mechanism. This is a simple operation since there is no need of keeping the carrier rotating when making the adjustment.

The mechanism for actuating the catch ring 55 includes a reciprocating rod 61 which carries a block 62. The latter has an upwardly extending projection 63, which is in position to engage the catch ring 55 at a point adjacent to the block 57, whenever the rotary parts of the apparatus are circumferentially positioned so as to bring the block 62 and the projection 63 into alinement. The rod 61 is provided with a shoulder 64 which presses against a corresponding shoulder provided in a bore of the block 62 in which the rod 61 is located. A pin 65, or like device, is used to hold the rod against withdrawal from the block 62. The rod 61 is provided with bearings 66 and 67 located in an auxiliary frame 68 secured to the wall 32 of the frame A by suitable screws 69. Within the member 68 is an enlarged bore or chamber 72 through which the rod 61 extends. The bearing 66 is formed by a sleeve located at one end of the chamber 72, and the bearing 67 is provided by the aperture in a plug threaded into the other end of the chamber. The rod 61 carries a flange 73, or equivalent device, against which one end of a compression spring 74 presses. The other end of the spring presses against the bearing member 66 and thus there is a constant tendency exerted to move the rod 61 outward. Whenever it is in this outer position, the catch ring engaging lug 63 will be free of engagement with the catch ring 55 as the latter rotates.

Obviously, when the rotary elements of the apparatus are set, any inward thrust of the rod 61 will cause the projection 63 to engage the catch ring 55 at a point adjacent to the block 57 and, then, when the stem B is raised slightly to free the ring, the latter may be moved out of groove-engaging position and it will be possible thereupon to vertically adjust the stem, as desired. Of course the positions of adjustment are limited to the number and positions of the various grooves 52. Once the parts have been vertically adjusted to the desired setting, corresponding to a groove 52, the catch ring 55 must be allowed to respond to the action of its spring 60 and thus be brought into groove engagement. Such a movement of the catch ring 55 will be permitted whenever spring 74, associated with the actuating rod 61, has been allowed to move the latter to its normal outer position.

The rod 61 must be shifted against the compression of its spring 74. This may be done by any suitable means. Preferably, it is done by an actuating lever 75, pivoted at 76 to one or more lugs 77 which project from the auxiliary frame 68. Normally the outer end of the rod 61 presses against the end 78 of the lever 75 and holds the latter in its normal position. To shift the rod 61 inward to operate the catch plate 55, when the parts are properly set, it is only necessary to rock the lever 75 about its pivot 76 and thereby force the end or foot 78 of the lever against the end of the rod 61 and move the latter inward to bring about the action previously described.

As shown more particularly in Fig. 8, the upper edge of the ring 40 of the bearing member A' is provided with a continuous groove 80. The members A and A' are, when once adjusted to each other, relatively fixed and constitute the stator of the apparatus. In one sense they form its base. This groove 80 is divided into four sections or segments. These have connections to a compressed air supply and to atmosphere. Through their agency, the jar supports, or lifters, D are raised and lowered at the proper points in their rotation. There is also a short section to be used in supplying lubricating oil to the interiors of the lifters. Four plugs 81, 82, 83 and 84 provide these four sections. The section between the plugs 81 and 82 is a short section and the one used in applying the lubricating oil. The section between plugs 82 and 83 is a long section and is the one by which compressed air is supplied to the lifters to raise them and the jars upon them. The section between the plugs 83 and 84 is a short exhaust section and allows for the lowering of the lifters. And the last section, namely, that between plugs 84 and 81, is a relatively long exhaust section, and while the lifters travel over it they remain in their lowermost positions. Really the travel between plugs 83 and 81 is over an exhaust channel, but the plug 84 is inserted so that any sudden discharge of air from any given lifter just after it has passed plug 83, will not kick up the lifter or lifters just in advance of it. Thus, any possible dancing of the lifters by reason of a sudden release of air from any one of them is prevented.

It will be apparent that the compressed air may be supplied from any suitable source and piped to the inlet ports 85 and 86. Thus, supply pipes 87 and 88 lead respectively to the ports 85 and 86. When it comes to the exhaust, suitable exhaust ports 90 and 91 are provided. These ports may be provided with exhaust pipes, if desired. In the present disclosure such pipes are shown by the short lengths 93 and 94.

When it comes to injecting lubricating oil up into the interiors of the lifters, any suitable device for combining air and oil and delivering the mixture to the point 85 may be employed. Such devices are well known. One is illustrated in the aforesaid Patent No. 2,147,366.

Because of the importance of having the various sections of the channel or groove 80 properly positioned with reference to the cooperating parts, in order to obtain proper operation, some provision must be made for an accurate rotary adjustment of the ring 40 about the central stem B. To provide for such rotary adjustment, the lower flange 31 of the base A is provided with a pair of lugs 98 which lie on opposite sides of one of the spokes 41. Through threaded openings in the lugs 98, oppositely positioned screws 99 extend and are brought into engagement with opposite sides of the interposed spoke 41. By unscrewing one of the screws 99 and screwing down on the other, an accurate positioning of the spoke 41 may be had. This means an actual rotary positioning of the bearing member B'. When this bearing has been once set in proper rotary position, then lock nuts 100 upon the screws 99 may be turned down against the lugs 98 to hold the screws against dislodgment.

The carrier C has an outer annular body 101 connected by spokes 102 to the central hub ring 47 which, as before noted, is secured to the sleeve 45 and is free to rotate with reference to the hub 42 of the circular bearing A'. The inner portion of the annular body 101 is provided with a central apron 103 which extends into the vicinity of the hub members 45 and 47. The apron 103 may be secured to the ring 101 in any desired way. Preferably this is accomplished by one or more screws 104. Each screw 104 passes through a short circumferential slot (not shown) in a bossed portion of the apron 103, shown in Figs. 1 and 2, into threaded engagement with a tapped opening in the adjacent portion of the carrier ring 101. By means of the circumferential slots, the two members 101 and 103 of the carrier C may be circumferentially adjusted relative to each other, to bring the filling heads H into proper vertical alinement with their respective lifters D. When adjusted, the screws 104 may be screwed home and the two parts of the carrier held in adjusted position. To adjust these parts 101 and 103 nicely, the apron 103 is provided with two spaced lugs 105 located near its periphery. Between these lugs 105 there is a notched opening 106 through which a stud bolt 107 is adapted to extend. This post is set in a vertical opening in a boss or lug 108 which extends inwardly from the carrier ring 101. A set screw 109 serves to hold the post 107 in proper position. Adjusting screws 110 are threaded through openings in the lugs 105 and abut against opposite sides of the post 107 to hold the two carrier members 101 and 103 in proper adjusted position. By letting off on either screw and screwing up on the other, the adjustment may be varied. The adjustment just described is the same as that set forth for a like purpose in the aforesaid Patent No. 2,147,366.

As clearly shown, the lower portion of the carrier ring 101 has connected to it a toothed ring 113. Suitable screws 114 pass through the ring 113 into threaded engagement with the body of the member 101. This toothed ring 113, when mounted upon the carrier, constitutes a gear wheel by which the carrier is rotated through the agency of gearing which will be pointed out more fully hereinafter.

The carrier ring 101 is provided with the jar supports which in this embodiment take the form of the lifters D, which raise and lower the jars M into and out of engagement with the filling heads H. The structure of these lifters is clearly disclosed in the aforesaid Patent No. 2,147,366, and need not be described herein in detail. Suffice it to say that the annular body 101 of the carrier has a number of upstanding posts 116 which form the bases of the lifters. Upon these posts 116 are heads 117 which are vertically movable, each upon its own post. Compressed air, admitted through a suitable passage 118, serves to raise the head, and spring mechanism within the head serves to restore it to its lowermost position when the air pressure is removed. The admission and withdrawal of air from the respective lifters are controlled by the ports 119 at the lower ends of the passages 118 engaging and communicating with the several segmental grooves formed in the upper face of the bearing ring 40. These, as before noted, are made by inserting the plugs 81, 82, 83 and 84 at proper points in the groove 80 formed in said upper face of the ring 40 of the bearing member A'.

In Fig. 8 where the groove 80 of the stator is most clearly shown, the rotor will travel clockwise as indicated by the arrow. Obviously, while compressed air is being applied to a particular lifter D, its head 117 will be thrust upward and maintained in its uppermost position. On the other hand, as soon as the lifter is brought into that position of its travel wherein only air at atmospheric pressure is available, then the head of the lifter will return to normal position and remain there. Obviously as each lifter passes over that portion of the groove 80 which lies between the plugs 81 and 82, oil laden air will pass up into the interior of the lifter to lubricate the parts.

The main supply tank or chamber E, considered apart from the cover G and the central supply tube J, is an open-topped tank. It comprises a cylindrical wall 122 and a dished bottom 123 which are suitably secured together at their meeting edges. Commonly the wall 122 and bottom 123 are welded together as indicated at 124.

The bottom 123 carries a series of bolts 125 around its periphery. Each bolt is fixedly secured to the bottom 123, preferably by welding. When assembling the parts, the bolts 125 are passed down through openings in a bowl 126. Cap nuts 127 upon the ends of the bolts 125 secure the tank and bowl together.

The bowl 126 is a casting which includes a tubular member 128 which functionally forms a continuation of the central tube 51. A washer 129 is positioned between the meeting ends of the tube 51 and the member 128. The latter member extends laterally to a point just beyond the periphery of the tank wall 122 and is there provided on its upper side with an opening for the reception of a removable vacuum pipe 130. Suitable packing and a packing gland 131 serve to make a reasonably tight joint. As clearly shown, the pipe or tube 130 extends upward and is built into the side wall 122 of the tank E. Upon leaving the wall 122 it extends outward and upward and then passes through the inclined wall 133 of the same tank. Where the wall 133 and the pipe 130 contact each other they are permanently connected together, as by welding, to provide an air tight joint.

The wall 133 forms part of the structure of the tank E. It is secured at its lower edge to the upper end of the tank wall 122. The lower portion of the wall 133 is inclined upward and outward. Its upper portion 134 is cylindrical. At its upper end it is permanently connected to an extension ring 164, hereinafter referred to as one of the seating points of the cover member G upon the tank E.

At its upper end, the tube 130 is connected to a vacuum collecting tube 135. The latter is in fact a hollow tubular ring which extends around the outside of the vertical wall 136 of the cover G and around the inside of its outer downwardly inclined wall 137. The annular tube 135 is connected to the upper end of the tube 130 through a sleeve 138 which fits over the end of the tube 130 and establishes communication between said tube and the collecting tube 135. The latter is provided with an outwardly opening slot 139 which may be practically continuous throughout the length of the tube or be broken up into different segments as may be desired. The tube 135, by reason of its position and construction, communicates with all parts of the vacuum chamber L with about the same degree of efficiency. Thus air from all parts of the chamber L is withdrawn with equal facility, when the vacuum pump is in operation, and sub-atmospheric pressure is produced in the chamber L.

In practice the tank E rests upon the central column B. The two tubular members 128 and 51 are brought together in vertical alinement and the former rests upon the latter, preferably with the washer 129 between. This washer is preferably composed of soft packing material. In the embodiment shown, the washer 129 is held in place, preferably by a rim 140 formed at the upper end of the tube 51. In some instances the metal faces of the tube 51 and the member 128 may meet without the intervention of a washer. Where a washer is used, any desired way of holding it in place may be employed.

Since the bearing furnished by the faces of the members 51 and 128 is relatively small in contact area, it is necessary to provide other holding means to maintain the tank E in its central position over the column B. For this purpose posts 143 are employed. These posts are preferably solid as shown, although they might be tubular, if desired. All of these guide posts are preferably mounted in the same way. It will suffice then to refer to the mounting of one such post, namely, that shown in detail in Fig. 1. As there shown, the post 143 passes through an opening in the apron 103 near its periphery and is held in place therein by a set screw 144. Preferably, three posts 143 are employed, and such is the number shown, although obviously more posts might be used if so desired. The manner of mounting the posts in the carrier 103, which has been illustrated, provides a proper guiding contact between the tank E and the posts 143, the bowl 126 upon which the bottom 123 of the tank is supported, providing the contact points in alinement with the guide posts. Shoes 145 engage the posts. These are concavely curved on their outer surfaces to properly fit the cylindrical surfaces of the posts and each is provided with a stem 146 which enters a socket 147 formed in the periphery of the bowl 126. The stem, when once positioned, is firmly held in place by a set screw 148 which is threaded into an opening in the adjacent portion of the bowl and, when screwed home, firmly presses against the stem of the shoe. It will be obvious that when the three or more guide posts 143 are in service, the main tank E, and the structure which it supports, will be firmly held in central position, and this will be true even when all the parts are rotating, as will be the case when the apparatus is in operation. The bottom 123 of the tank E is provided with a drain pipe 151 provided with a closing cap 152. As clearly shown, the bottom 123 of the tank is dished and the drain pipe 151 is located at a low point in the bottom of the tank. In operation, the drain, which is normally closed, may be opened by removing the cap 152 when it is necessary to empty the tank. To prepare for service, after emptying, the cap 152 is replaced upon the pipe 151.

The outer wall 122 of the tank E is pierced by a number of supply tubes 153. These tubes terminate at their inner lower ends near the bottom 123 of the tank and, as shown, extend upward and outward into communication with the filling heads H, there being one tube 153 for each filling head. The tubes 153 are preferably reinforced by sleeves 154 at the points where they pass through the tank wall 122. The tube 153, sleeve 154, and tank wall 122, in each instance, are all firmly and permanently secured together, as by welding. Thus, the several tubes 153 are symmetrically disposed about the tank axis, and extend from points well below the level of the substance in the tank, indicated in Fig. 1 by the dash line 155, to the heads H which are well above that level. It should be noted that the tubes 153 in this apparatus do not lie in vertical radial planes but occupy planes which are inclined to the radius and more or less tangentially to the float F. This arrangement provides for tubes of considerable length while employing a float F of comparatively large size. In other words, the arrangement conduces to compactness. It should also be noted, while considering the tubes 153, that the lower ends of these tubes are cut off along a horizontal plane. This makes all points of the lower end of each pipe an equal distance from the level of the substance in the tank. In other words, each point in each pipe inlet is subjected to the same head of substance pressure.

Thus, the flow of the substance in the case of each tube is the same at all points around the periphery of the inlet opening.

Within the main tank E is the float F. This float comprises a top 156, an inner wall 157, an outer wall 158 and a bottom 159. The latter is an annular member which is V-shaped in cross-section. It may be made in whole or in part by extending the side walls. These various inclosing members of the float are composed of sheet metal and the parts are permanently secured together by soldering or welding. The float is buoyant within the substance in the tank E. As it rises and falls, it reciprocates a valve sleeve 160, which will be referred to more fully hereinafter when considering the structure of the supply pipe J.

The tank cover G has been referred to heretofore as comprising the inner wall 136 and the downwardly and outwardly inclined wall 137. These walls are firmly secured together at their tops and are provided with an angle-bar ring 163 which extends completely around the structure. These parts are composed of metal and are secured together by any suitable means as by welding. As clearly shown, the lower edge of the tubular wall 136 of the cover G is provided with the packing K, and it is at this point that it engages the upper edge of the wall 122 of the tank E. On the other hand, the lower edge of the wall 137 is arranged to fit against the extension ring 164, previously referred to as secured to the top edge of the tank wall 133 which extends upward and outward from the top of the main tank wall 122. The walls 134 and 164 are fitted together and held in place by welding or other suitable means. It is at the point where the lower edge of the cover wall 137 meets the upper edge of the tank wall member 164 that the sealing ring K' is located.

The upper end of the cover G, outward of the supply pipe J, is closed by a hood or cap 165. The latter is flanged at its periphery and preferably contacts the ring 163 when in position. The center of the cap 165 is apertured at 166 for the passage of the supply pipe J, as clearly illustrated. Two handles 167 are provided on the cap 165. In the embodiment illustrated, these handles are in the form of balls of Bakelite or similar material, and each is held to the cap by means of a headed bolt 168 which is threaded into an opening in the ball. It will be seen, when the parts are assembled, and the material that is to be filled into the jars is located in the tank E, that the latter is subject to atmospheric pressure by reason of the opening 166 around the pipe J. When assembling the cover member G upon the tank E, suitable means are provided for centering the one upon the other. In the preferred structure, these means consist of three guide rods 169 which are secured at their lower ends to the inside surface of the wall 122 of the tank E. These guides are shaped so as to clear the packing K and yet serve to bring the cover G and the tank E into proper alined position.

From what has been said, it will be seen that in forming the vacuum chamber L the tank E and the cover G coact. Thus, one is supplemental to the other. It is the tank E that constitutes the main supply chamber and provides certain of the enclosing walls of the chamber L and the cover member G is a supplemental member which provides the remaining walls of the chamber. It may be noted that the walls 136 and 137 of the member G, being connected as they are, form an inverted open annular trough which coacts with the walls of the tank E to give the vacuum chamber its annular form.

Turning now to a consideration of the filler heads H, associated with the outer ends of the supply pipes 153, it will be noted that these heads in general are similar in construction to those illustrated in the aforesaid Patent No. 2,147,366. There are some differences, however, which are of real importance, because of the different substances to be handled. The novel filler head, used in the present instance, is illustrated more particularly in Figs. 13 to 16 inclusive. As there shown, it comprises a body 170 having a removable nozzle 171. These parts with other cooperating parts constitute a closure for the top of the jar or other receptacle to be filled. The nozzle 171 is secured to the body 170 by means of a coupling member 172. The latter, as clearly shown, is threaded upon the lower end of the body 170 and is provided with an overhanging portion 173 which engages an overhanging portion 174 upon the nozzle 171, as the parts are assembled and the clamping member 172 screwed home into final position. A dowel pin 175 is secured in an opening in the upper face of the nozzle 171 and fits, when the parts are assembled, into a cooperating opening in the under face of the body 170. This pin sets the nozzle 171 with reference to the body 170 so that the passages therein will register. Through the complete assembly, including the body 170 and nozzle 171, there extend the supply and vacuum passages. These may be considered as single passages extending through both members 170 and 171. The substance supply passage, designated 176, terminates in a supply port 177 located in the lower face of the nozzle. The vacuum passage, designated 178, extends through the assembly and terminates in a vacuum port 179, also located in the lower face of the nozzle. This lower face is substantially horizontal, as illustrated.

In the lower end of the supply passage 176 adjacent to the port 177 is a spreading device in the form of a cone 180. This cone is centered within the port 177 and is supported by a thin blade or leaf 181 which is fitted at one end in a cut in the cone, and at the other end in a cut in the nozzle 171. As noted, the base of the cone lies in the same horizontal plane as the ports 177 and 179. Obviously, in service, the substance upon encountering the cone 180 will be spread outward, as it passes into the jar. As the air pockets or bubbles, which form in the substance by reason of the entrance of air through the tube H', enter the jar, the greater pressure of air or gas within them will cause the substance to be thrown with considerable force into contact with all the interior surfaces of the jar, thus insuring a good filling of the jar with the substance.

The body 170 of the head H is provided with an inclined rectilinear branching portion 182, formed integral with the rest of the body. The branch 182 is suitably bored out from end to end and at its lower end it receives the upper end of the pipe 153 which goes to form the complete structure. The pipe 153 is preferably welded into position in the branch 182. The upper open end of the branch 182 is normally closed by a plug 183. When this plug is removed, a swab rod or other cleaning device may be used to wash out the interior of the branch and the interior of the associated tube 153. The supply passage 176 communicates with the interior of the bore formed in the branch 182. Thus the mayonnaise or other substance, ascending by way of the pipe 153, will pass into the supply passage 176 and be delivered at the port 177 to the spreading action of the cone 180. In its final position, each head has its upper end or neck 184 welded into position upon the vacuum chamber wall 133.

The vaccum passage 178 within each head H is extended through extension vacuum tubes 185 and 186. The former extends but a short distance above the connecting portion 184 of the head. The latter has a sliding fit upon the upper end of the former and extends to a point well up in the vacuum chamber L. The lower end of the tube 185 is permanently secured within an opening in the neck 184 of the head, in line with the vacuum passage therein. The tube 186, by reason of fitting loosely upon the tube 185, may be removed when it is desired to clean the apparatus.

At the upper end of each extension tube 186 is an inverted cup 187 into which the tube opens. The cup 187 in each instance is secured to the tube by means of one or more transverse strips 188 which are firmly secured to the tube and to walls of the cup 187. With this arrangement, any excess of substance which passes over from the jars M, on through the suction passages 178 into the vacuum chamber L, will encounter the cups 187 and the latter will act as baffles to readily separate the substance and air in the vacuum chamber and allow the air to readily escape through the collecting tube 186.

The nozzle 171 is provided with an overhanging peripheral shoulder 190 which, when the parts are assembled, lies substantially flush with the lower face of the coupling nut 172. Against the resulting under face so formed, fits a cushion holding ring 191. The latter has an upper horizontal portion which is apertured and fits over the nozzle 171 and against the said under face, as just explained. It also has a peripheral skirt which extends downward beyond the end of the nozzle and terminates in a beaded edge 192. Within the member 191 rests a soft cushioning washer 193. This washer presses inward against the wall of the lower portion of the nozzle 171 and at its outer peripheral edge it presses against the inner wall of the skirt of the member 191. This washer 193 is usually composed of soft rubber and the action between the inner and outer surfaces, just noted, firmly holds the member 191 and its included washer in position upon the nozzle 171. The structure thus produced is in fact a cushioning nozzle adapted to seal the mouth of the vessel pressed against it.

The washer 193 is provided on its under side near its periphery with an extension 194. This extension is preferably formed integral with the main portion of the washer but does not project inward to the same extent. The upper portion of the extension 194 is provided with a series of openings 195 which lie in a plane closely adjacent to the lower horizontal face of the nozzle 171. The apertures 195 preferably take the form of flat slots, and they are in line with a series of openings 196 extending through the skirt of the member 191. In operation, the upper edge of the jar M, when the latter is moved upward into filling position, will press upon the projection 194 with sufficient force to close the apertures 195. This will cut off the interior of the jar from atmosphere by way of the openings 196 in the skirt of the member 191. This compressed condition of the projection 194 will continue during the filling of the jar. Finally, when the latter is properly filled, and the movement of the jar is downward away from the head H, then the first ingress of air will be through the skirt openings 196 and the cushion openings 195. The series of openings 195, in fact, constitute valve openings in the material which unites the washer 193 and its extension 194. The latter parts move toward and from each other, thus providing a valve closing and opening action. This valve action controls communication between the interior of a positioned vessel and atmosphere. When pressure is applied by the vessel, as in filling, the action is to close the valve openings. When pressure is removed by downward movement of the vessel the action is to open the valve.

Now, returning to the flow of air from the periphery toward the center, it will be seen that it will tend to move the mayonnaise at the top of the jar toward the center. In practice, this action is such that the filled-in mayonnaise will stand up a little higher at the center of the jar than it does near its periphery. As a result of this extra filling at the center, the placing of a cap or cover on the jar will tend to move the central excess outward and thus insure a complete filling at the top of the jar without air between the substance and the cap or cover. This complete filling without a top air pocket just beneath the cap or cover insures a more salable product than where air is left between the cap and the product. In such case, the product may be seriously contaminated. We avoid this result by completely filling the containers in the way just pointed out.

Attention should be called to the fact that the air tube H' passes at one end through the plug 183 and its metal cap 199. The plug is preferably composed of relatively hard rubber. The tube H' is of small diameter and is composed of metal. It extends within and lengthwise of the tube 153 to a point adjacent to the lower end of the latter. At its upper end, tube H' is firmly secured to the plug and cap, connection to the latter preferably being made by welding the parts together. In practice, it is found that with mayonnaise better results are ordinarily obtained by having the atmospheric tube H' off-center with reference to the tube 153. This is a matter which may be varied, and the air tube H' may be placed concentrically of the tube 153 or eccentrically thereof as may be found most satisfactory in the case of any given substance. In the modified arrangement of Fig. 17, the tube H² terminates in an upturned end 200, which end is concentric with the associated tube 153. Where the arrangement of this figure is employed, obviously, the tube H² must be mounted independently of the plug 183. Since this arrangement is but diagrammatically illustrated no particular support for the upper end of the tube H² is shown, but any suitable support may be provided and, obviously, any worker in this art will have no difficulty in providing one.

The supply tube J is a simple tube of substantial size suited to the carrying of the substance to be filled into the jars. The upper end of this tube is suitably connected with any source of supply and for this purpose it is shown as threaded at 201. At its lower end the tube J is secured to a valve sleeve 202 which cooperates with the sleeve 160 upon the float F. The sleeve member 202 is of substantial thickness and is preferably secured to the lower end of the tube J by silver solder. The upper end of the member 202 is provided with an outwardly extending flange 203 which serves as a stop to limit the upward movement of the valve sleeve 160.

At its lower end, the member 202 is interiorly threaded for the reception of a closing cap or nut 204. When this cap is in position, its periphery extends beyond the limits of the member 202 and such extension serves as a stop for the downward movement of the valve sleeve 160. These members 160 and 202 constitute a slide valve, the members having suitable openings 205 therein. When the valve sleeve 160 is in its lowermost position, then the openings 205 register and the valve is wide open, and, when the valve sleeve 160 is in its uppermost position, then the openings 205 do not overlap and the valve is entirely closed. In intermediate positions, the openings 205 will more or less overlap and the valve will be partially open. Obviously, when the valve is open to any extent, the mayonnaise or other substance within the tube J will pass through these openings into the interior of the tank E. As the tank fills up with the substance, and the level is raised, then the float F will respond, and finally under the lifting action of the substance will raise the valve member 160 far enough to more or less cut off the supply of substance through the valve openings 205, as before noted. Whether this movement completely closes the openings or not is immaterial so long as the level of the substance in the tank is kept at a proper elevation. As before noted, the approximate level is that indicated by the line 155 of Fig. 1.

Coming now to the sealing means by which the vacuum chamber is made substantially air tight, we may first consider the member K. This member is molded in the form of a ring having a U-shaped cross-section. When assembled, the lower edge of the wall 136 of the member G enters the space between the upstanding portions of the ring. In addition to the lower edge of the member 136 entering into the member K, there is also a reinforcing metal ring 207. Rivets 208 hold the ring 207, plate 136 and member K together. When the parts are thus assembled, the lower face of the resilient member K finds a seat upon the upper edge of the wall 122 of tank E and upon the immediately adjacent port of the inclined tank wall 133.

Turning next to the sealing member K', it will be seen that the same is a plain band of resilient material which is held along its lower portion between rings 209 and 210. The two rings and the intervening resilient band K' may be readily assembled and secured together as a unit. Then the unit may be slipped down over the outside of the upper edge of the member 164 of tank E, until the inner ring 209 rests down upon the outwardly extending bead 211 formed in the member 164. When so positioned, the band K' will remain in place. The upper portion of the band K' engages a reinforcing ring 212 which is secured to the lower portion of the wall 137 of the cover structure G in any suitable way, as by welding. With reference to the sealing member K', it should be noted that the same, although to some extent yielding and flexible, must still retain its shape so that when the cover G is lifted the ring 212 upon the wall 137 will slip out from under the outer edge of the sealing member K'; and, again, when the member G is lowered, the ring 212 will slip down under the upwardly extending edge of the sealing ring K'. It will not do for the upper free edge of the band K' to fold over the upper end of the member 164. There are rubber compounds on the market that will meet these requirements.

Coming now to the vacuum chamber L, it will be seen that the same is an annular chamber which exists when the parts G and E are in contact and the sealing means K and K' are functioning. Such chamber will be bounded on the inside by the wall 136 and on the outside by the walls 133, 134 and 137. In operation, as before indicated, the members G and E will be periodically separated, and then brought together again. During these periods of separation, there will be no vacuum chamber. But as soon as the parts come together, the chamber L will be restored and it will become a vacuum chamber by reason of the exhaustion of air therefrom through the vacuum pipe 130 and the associated vacuum pump (not shown).

The jars M are preferably glass jars, here shown as mayonnaise jars. However, it will be understood that such are merely illustrative and that other kinds of containers might equally well be used. When such is the case, it may be necessary to modify the soft washers used with the filling heads H. All this will be apparent to those skilled in this art.

In order to bring about the raising and lowering of the cover member G, in the manner previously indicated, the hoist mechanism N is employed. In the present instance, we employ in this mechanism, a ring-like assembly which lies just below the horizontal web of the member 163 forming part of the structure of the movable cover G of the apparatus. This assembly is clearly shown in Fig. 6. It consists of two segmental members 213 and 214 which are pivoted together at 215. The end of the member 214 distant from the pivot 215 is provided with an opening through which a tongue 216 secured to the member 213, is adapted to extend. A pin 217, passing down through openings in the tongue 216 and the adjacent portions of the member 214, holds the two segments 213 and 214 together, in position to complete the entire ring assembly. The member 213 is rigidly secured to the end of an actuating member 218 which extends downward as a tube into a tubular member 219. The members 218 and 219 are in telescopic arrangement and the member 218 is movable vertically within the member 219 to different adjusted positions. To this end the member 219 is provided with a series of openings 220. These openings 220 cooperate with a single opening in the member 218 to bring about the adjustment. A pin 221 extends through registering openings in these members and thus they are held in adjustment. The opening in the member 218 is provided by a transverse tube 222 which is secured to the tubular walls of the member 218 by welding or the like. When the headed pin 221 is in place, it is held by a cotter pin 223, or like device. To the lower end 224 of the member 219, a tube 225 is secured. This tube extends down through a cylinder block 226 into a bearing tube 227.

The lower end of the latter is provided with a cap 228 through which extends a stop screw 229. This screw is threaded through an opening in a central boss 230 formed at the center of the cap 228. A nut 231 and associated washer 232 serve to hold the screw 229 in any desired adjusted position. The upper end of the screw 229 serves as a stop for the downward movement of the tube 225. In doing so, it is engaged by the head 233 of a screw 234 threaded into a block 235 located in the lower end of the tube 225. The latter carries the screw 234 up and down with it and the engagement of the two screws limits the downward movement of the tube.

Besides the block 235 at the bottom of the tube 225, there is a washer 236. This is held in place by the head 233 of the screw 234. The periphery of this washer extends beyond the limits of the tube 225 and thus provides a bearing for the bottom of a ring 237 which fills the space between the outside of the tube 225 and the inside of the tube 227. Above the ring 237 and between the inner and outer tubes is a coiled compression spring 238. At its upper end, the spring 238 engages the under side of a ring 239 which is firmly secured to the cylinder block 226. In brief, this means that the spring 238 acts between the block 226 and the tube 225. Obviously, when unhindered, the spring forces the tube 225 downward until the screw head 233 engages the top of the screw 229. To bring about a movement of the tube 225 in the opposite direction, said tube is furnished with a piston 240 which is adapted to travel within the cylinder chamber 241 of the cylinder block 226. The piston 240 is firmly secured to the tube 225. This is brought about by welding to the tube a ring 242 and then using a clamping ring 243 with suitable screws 244 to hold a packing 245 in place. The piston 240 is located upon the tube 225 in such position, that, when the tube 225 is down against its stop screw 229, there will be a space within the cylinder below the piston 240. It follows, then, that if air under pressure is admitted through pipe 246, which communicates with this space, and sufficient pressure is exerted the piston 240 will be moved upward against the compression of the spring 238. This upward movement will continue until the piston reaches the upper end of the cylinder. Thereupon, it will remain elevated until the air pressure on the under side of the piston is removed. Then, the spring 238 will restore the tube 225 to its lowermost position against the stop 229. In order to allow for the free passage of air into and out of the upper end of the cylinder a small opening 247 is provided. This opening places the space within the cylinder 241 above the piston 240 at all times in direct communication with atmosphere. The outer tube 227 is also provided with a pet-cock 249 for the purpose of draining off condensation. The control of air to and from the cylinder through the pipe 246 will be more fully pointed out hereinafter.

Suitable conveying mechanism O is provided for carrying the jars to and from the rotating lifters D upon the carrier C. This mechanism is similar to that shown and described in the aforesaid patents, but, in the present case, there is no capper in association with the filling mechanism so the conveying mechanism is somewhat simpler. The parts which cooperate to produce the necessary travel include notched conveyer wheels 250 and 251 and a guide member 252. The wheels are mounted on vertical shafts which are journaled in the frame of the apparatus and the guide member 252 is suitably supported. The member 252 cooperates with the notched wheels in providing definite paths for the travel of the jars. Thus, referring to Fig. 5, if the jars are assumed to travel in the direction of the arrow along the rectilinear conveyer 253, then, as they advance, each will encounter the curved face 254 of the member 252 and the teeth of the wheel 250 and be carried around a curve and deposited on one of the lifters D of the apparatus. After traversing the filling path, each jar will again encounter the member 252, this time contacting the curved surface 255, and be carried by the teeth of the wheel 251 from the lifter D, on which it has been standing, and moved into the rectilinear portion 256 of the conveying mechanism. This kind of conveyer mechanism is well known and need not be further described.

In order to adjust the apparatus to meet the requirements of jars and other containers of different sizes, the adjusting mechanism P is employed. This mechanism is substantially the same as that disclosed in the aforesaid patents. It includes a heavy rock-shaft 257 which is journaled in suitable bearings formed in brackets 258 and 259 secured to the under side of the base A. This rock-shaft is provided with an upwardly extending crank arm 260 which is suitably secured to the shaft. The upper end of the crank arm 260 is pivotally connected to one end of a horizontally disposed member 261. The opposite end of this member is provided with a threaded opening through which extends a screw 262. This screw is connected by suitable means to a crank 263 journaled in bearing members 264 in the base A. It will be seen that as the crank 263 is turned, the member 261 will be moved to and fro along the screw 262. As a result, the rock-shaft 257 will be given a rocking movement. Because of the screw connection, the rotary adjustment of the rock shaft can be accomplished with great accuracy and nicety. As the shaft is rocked the vertically adjustable parts of the machine are raised and lowered through the agency of a rock arm 265 which is secured to the shaft 257 and has bifurcated ends 266 which extend on opposite sides of the central vertical axis of the rotating elements.

Upon reference to the drawings and particularly to Fig. 2, it will be seen that the bifurcated arms 266 of the member 265 pass down opposite sides of the thrust bearing B' located at the bottom of the central column B of the apparatus. Links 267 cooperate with the bifurcated ends 266 and are pivotally connected to the lower portion of the bearing B' by suitable pivot pins 268. It will be obvious that when the adjusting shaft 257 is rocked, the crank arm 265 will act through the links 267 to raise and lower the thrust bearing B' to bring about the vertical adjustment previously mentioned. The adjustment, when once made, is maintained by the catch mechanism B², as previously explained. Thus, adjustments may be made to suit the different sizes of jars or other containers to suit the operation of the apparatus. These thrust bearing parts need not be further described, as they are the same as disclosed in the aforesaid Patent No. 2,147,366, Fig. 22 of that patent showing details of construction.

For the purpose of driving the various parts of the apparatus in proper timed relation suitable gearing must be provided. This gearing is similar to that disclosed in the aforesaid patents. In the present instance, driving power is obtained from the electric motor R which is carried upon a frame 271 suitably secured upon a supporting shaft 272 extending downward from the floor 30 of the machine. The motor shaft drives a pulley 273 which operates through a belt 274 to drive a pulley 275 upon the shaft 276 which constitutes the primary driving shaft of the apparatus. A gear wheel 277 is fixed to the shaft 276 and meshes with the toothed ring 113 upon the rotor of the apparatus. From the ring 113 a gear wheel 278 is rotated. This wheel is upon the vertical shaft 279. The shafts 276 and 279 extend up through the floor 30 and carry the toothed conveying wheels 251 and 250, respectively, upon their upper ends. Thus, as the main rotor travels, the conveying wheels 250 and 251 travel, all in timed relation to each other. Although the motor R is shown as mounted on a vertical axis 272, it is obvious that the same might be otherwise mounted. When so mounted, it might be rocked by any suitable mechanism to keep the belt 274 taut. These are matters which do not enter particularly into the present invention and obviously may be arranged as desired.

As shown in Fig. 8, the pipes 87 and 88 which furnish air under pressure to the ports 85 and 86, are preferably terminal branches from a compressed air line 280. A control valve 281 connecting the pipe lines 280 and 282 may be employed to cut off the supply of compressed air from the pipes 87 and 88, it being assumed that the pipe 282 is connected with a source of compressed air. When the valve is open, there is a passage between the pipes through the valve opening 283. When the valve is closed, this opening is out of register with the pipes 280 and 282. Whenever the machine is in readiness for operation, or actually in operation, the valve 281 is open.

In furnishing the suction necessary to produce vacuum in the vacuum chamber L, it is necessary to employ some sort of suction pump or its equivalent. In the present instance no such pump is illustrated, but if desired one such as disclosed in one of the aforesaid patents may be used. It will suffice for the present disclosure to point out that there is a vacuum connection provided. As before indicated, such a connection would extend from the vacuum chamber L through collecting pipe 135, pipe 130, passage 284 (in member 128) and pipe 51 to the interior of the thrust bearing B'. From the latter, the connection extends through the flexible armored tube 286 to the valve mechanism Q and thence on through other conduit mechanism 287 to the vacuum pump or other exhaust agency. Enough slack is provided in the flexible tube 286 to allow for vertical adjustments of the rotor in the manner previously described.

The valve assembly Q is supported upon a bracket 288 extending down from the under side of the base A. The casing of the valve mechanism Q includes two parts. The first of these comprises a tube 289 having at its opposite ends coupling members 290 and 291. These parts are suitably welded or otherwise secured together. The flexible armored tube 286 ends in a flanged ring 292. A flanged coupling 293 serves to unite the tube to the casing of the valve assembly Q, a washer 294 intervening between the ring 292 and the adjacent valve casing member 291.

The second part of the valve assembly includes a tube 295 having end members 296 and 297. A flanged coupling ring 298 connects the member 290 of the first part of the assembly to the ring 297 of the second part, and thus the two parts are united. Between the rings 290 and 297 is a flat plate 299 which is provided with a central aperture 300 which constitutes the valve opening. The member 299 forms the seat of the valve. The movable member 301 constitutes the valve proper and is adapted to seat itself upon the member 299 or be moved therefrom in accordance with the operation of the associated bellows mechanism 302. A ring 303 surrounds the tube 295 and is connected to the bracket 288, thus providing the mechanical support required by the valve assembly. The head 296 is shaped at its outer end similarly to the member 291 and acts through an intervening washer 304 and an associated ring 305 on the tubing 287, to provide a tight connection. A flanged coupling member 306 serves to tighten the one upon the other. The head 296 also has a tapped opening for connection with the pipe 307. The interior of the pipe communicates with a passage 308 within the head 296. The passage 308 also communicates with a passage 309.

In the bellows mechanism 302, there is an end member 310 and a cooperating end member 311, oppositely positioned. The bellows 312 is connected at one end to a flange 313 extending outwardly from the member 310. At the other end it is connected to the peripheral flange-like edge of a member 314 which is fitted over a reduced end of the member 311 and firmly secured thereto. Thus, upon expansion of the bellows, the member 311 moves with reference to the member 310. In order to hold the member 310 in firm engagement with the head 296, screws 315 are employed. These screws extend through openings in the head 296 and on into threaded openings in the member 310. A gasket 316 lies between the two surfaces and when the screws 315, of which only one is shown, are screwed home, the head 296 and member 310 are held firmly together. The interior of the member 310 is provided with a passage 317 which opens into a passage 318. The latter extends to one point of the periphery of the member 310 and thus supplies a passage for air into the interior of the bellows 302. A sleeve 319 is secured at one end to the member 310. This connection may be made in any desired way, by welding or otherwise, in order to secure the parts together firmly. The other end of the sleeve 319 is provided with an inturned flange 320. Within the space bounded by the tubular member 319, there is a tubular extension 321 formed on the inner end of the member 311. The latter has an outwardly projecting flange 322 located in opposition to the flange 320 on the member 319. Between these opposing flanges 320 and 322 is a coiled compression spring 325. This spring normally holds the flanges apart. This means that the spring normally holds the flange 322 down against the end member 310. This corresponds to the closed position of the valve 301.

The valve 301 has its stem 326 screwed into an opening in the end member 311. The valve 301 is secured to its stem 326 in any suitable way, as by welding, indicated at 327. From this description it will be seen that when air under pressure is admitted to the interior of the bellows, it will apply pressure against the end member 311 and force the latter outward, and thereby open the valve 301. The valve will remain in this condition until the air pressure within the bellows is lowered. Ordinarily, the pressure for opening the valve will be a definite amount, and that which exists when the valve is to be closed will be the pressure of atmosphere. The means for controlling the supply of air to the pipe 307, and on to the bellows 312, will be taken up later, when considering the various controls of the apparatus. Before passing from consideration of the valve mechanism Q, it should be noted that the ring 303 has a supporting base 328 which is held to the bracket 288 of frame A by securing bolts 329.

Referring to the circuit diagram of Fig. 20, it will be seen that beside the rotor parts E and G, the vacuum supply connection controlled by valve Q, and the motor R, already described, there are other parts. These may be briefly described before tracing out the various circuits that come into play in the operation of the apparatus.

First of all, we may consider the starting switches S and S' and the stopping switches T and T'. Each switch is simple in construction, comprising a movable bridging contact and two fixed contacts. Pressure upon a push button 331 moves the bridging contact from its normal position and a spring 332 returns it to normal when the manual pressure upon the button is removed. The starting switches S and S' are normally open and the stopping switches T and T' are normally closed. Associated with these switches are three control conductors 333, 334 and 335. One of these, namely, conductor 334, extends only to the first stop switch T. An extension 334ᵃ of this conductor extends from switch T to switch T'. A second extension 334ᵇ extends from switch T' to conductor 335. Thus, the two conductors 334 and 335 with the extensions 334ᵃ and 334ᵇ included, form a loop with the switches T and T' connected therein in series. The starting switches S and S', on the other hand, are connected in parallel between the conductor 333 on the one hand, and the conductors 334, 334ᵃ and 334ᵇ on the other hand. When either switch S or S' is manually operated, circuit is closed between these two conducting branches. And when either switch T or T' is manually operated, the circuit including the loop, embracing conductors 333 and 334, is opened. The switches are arranged in pairs, switches S and T going together and switches S' and T' going together. If additional switches are to be used the starting switch will be connected in parallel and the stopping switch in series, as will be obvious.

The main switches or contactors U and U' are heavy enough to carry the current of the motor R. They are similar in construction, each having an operating coil 336 and a movable contact element which normally rests against a stop 337. The contact element 338 of switch U carries four sets of bridging contacts and the corresponding element 339 of switch U' carries three such sets of contacts.

The overload circuit breakers V and V' may vary greatly in construction. In the present instance, the diagram shows a solenoid operated switch in which the coil 340 is normally short circuited by a thermal unit in the form of a fuse 341. Normally the current flows through the fuse practically to the exclusion of the coil, but in case the current becomes an overload then the fuse blows and the current passing through the coil moves the core element 342 upward to open the switch contacts. In tracing the circuits hereinafter, only the fuse will be included when a normal circuit is traced. This is because the small amount of current passing through the associated coil will not operate the switch and may for the time being be disregarded.

The solenoid valves W and W' are three-way valves. When in their normal positions they cut off the compressed air supply and drain the associated piston or bellows, as the case may be, but when operated electrically, they supply air under pressure to the associated mechanisms. The valve W is operated by current passing through the coil 343. Similarly, the valve W' is operated by current passing through the coil 344. The former controls the admission of compressed air to the under side of the piston 240 of the hoist N, and the latter controls the admission of compressed air to the bellows 302 of the valve mechanism Q.

Besides these, there is the timer X. This timer is graphically illustrated and comprises a driving motor 346 and a series of movable contacts 347, 348 and 349. These contacts are actuated by cams 350, 351 and 352 upon a shaft 353 driven by the motor 346. The cams have full diameter portions and portions which are cut away. In this way, as they rotate, the spring contacts are moved into and out of engagement with their mating fixed contacts. Each spring contact 347, 348 or 349, as the case may be, normally tends to move toward its cam. Thus, when the cut-away portion of the cam is present beneath the spring contact, it will be in open position. On the other hand, when the full diameter portion of the cam is pressing against the spring contact, it will be in closed position. Thus, as shown in Fig. 20, contacts 347 and 348 are in closed position and contact 349 is in open position. As shown, the motor 346 is operatively connected to the shaft 353 through suitable speed changing gearing within a casing 345. Timers of the kind thus diagrammatically shown, are old in the art and available on the market and need not be described more in detail.

The various parts shown in the diagram of Fig. 20 and their operations will be best understood by following out those operations and tracing out the circuits accompanying them. As clearly shown, the main supply leads 354, 355 and 356 constitute those conductors from which electric current is obtained for the operation of the several devices.

Assuming that the apparatus, as shown in the diagram, is in condition for operation, we may proceed to a consideration of the circuits therein shown. Since the parts are at rest, the first step will be to manually close one of the switches S or S'. Assuming that the switch S is closed, then a circuit will be established which may be traced from supply lead 356 through conductor 357, closed contacts of circuit breaker V, conductor 358, the winding 336 of switch U, conductor 359, closed contacts of circuit breaker V', conductors 335 and 334ᵇ, closed contacts of switch T', conductor 334ᵃ, closed contacts of switch T, conductor 360 between switches S and T, closed contacts of switch S, conductor 361 of switch S, and conductors 333, 362 and 363 to supply lead 354. This circuit includes the solenoid winding 336 of switch U and the current flow is sufficient to operate said switch. As a result of the closing of switch U, there will be formed a locking circuit for the winding of said switch. Such locking circuit may be traced from supply lead 356 through conductor 357, closed contacts of circuit breaker V, conductor 358, winding 336 of switch U, conductor 359, closed contacts of circuit breaker V', conductors 335 and 334ᵇ, closed contacts of switch T', conductor 334ᵃ, closed contacts of switch T, conductor 334, closed contacts 337ᵃ of switch U and conductors 362 and 363 to supply lead 354. This locking circuit will exist independently of the position of the manual switch S.

The closing of switch U will also close a circuit for switch U', a circuit for the motor R and a circuit for the motor 346 of the timer X. This circuit may be traced from supply lead 356 through conductor 364, closed contacts 365 of switch U, conductor 366, fuse 341 of circuit breaker V, conductors 367 and 368 to one terminal of the motor 346. From the other terminal of the motor 346, the circuit extends through conductors 369 and 370, closed contacts 371 of the switch U and conductor 372 to supply lead 355. Obviously, the closing of this circuit sets the timer X in operation.

With the parts of the timer as shown in the diagram, it will be apparent that there is a circuit established through the winding of the switch U' at the same time the circuit through the motor 346 is established. This circuit is in parallel to the circuit through the motor. It extends between conductors 368 and 369, and includes conductor 373, the winding 336 of switch U', conductor 375, closed timer contact 347 and conductor 367. As a result of the closing of this branch circuit, the switch U' is operated to close its contacts.

In addition to the branch path just traced between the conductors 368 and 369, there is another parallel branch path which includes the winding 344 of the electrically operated valve W'. This branch path may be traced from conductor 368 through conductors 377 and 378, winding 344 of valve W', conductor 379, closed timer switch contact 348 and conductor 367 to conductor 369. The result of the closing of this branch circuit is to operate the valve W' to supply compressed air to the valve Q to open the latter to supply vacuum to the vacuum chamber of the apparatus.

The closing of the switch U' brings the motor R into circuit. The motor illustrated, being a three-phase motor, is provided with three branch connections. One of these extends from supply lead 356 through conductor 364, closed contact 365 of switch U, conductor 366, fuse 341 of circuit breaker V, conductor 367, closed contact 380 of switch U' and conductor 381 to one terminal of the motor. The second branch extends from supply lead 355 through conductor 372, closed contact 371 of switch U, conductor 370, closed contact 383 of switch U' and conductor 384 to a second terminal of the motor. The third branch extends from supply lead 354 through conductor 363, closed contact 385 of switch U, conductor 386, fuse 341 of circuit breaker V', conductor 387, closed contact 388 of switch U' and conductor 389 to the third terminal of the motor.

Obviously, in case of an overload upon the motor R, the current flow over the motor supply circuit will increase. If the overload persists long enough, then one or both of the fuses 341 of the overload circuit breakers V and V' will be melted and the circuit diverted through one or both of the coils 340 of these switches. Where this occurs, one or both of the bridging contacts of the circuit breakers breaks the circuit through the winding 336 of the control switch U. When this occurs, the several contacts of that switch open and the motor circuit is opened and the locking circuit for the winding 336 is opened. The rupturing of these circuits also deenergizes the winding 336 of switch U' and the winding 344 of valve W'. Thus, the timer X is disconnected and brought to rest. Likewise, the vacuum supply is cut off by reason of the deenergization of the coil 344 of valve Q. In this way the parts are brought to normal after an overload. When the necessary circuit breaker fuses are replaced, then the parts may be set going again by operating a starting switch as before described.

But, assuming that there has been no overload, then the parts are in the condition before noted. In such case the vacuum supply is available and the vacuum chamber L is being evacuated, the motor R is driving the rotor of the apparatus, and the timer X is running. This means that the filling of jars upon the apparatus will be under way. These filling operations will continue for a definite period of time, depending upon the timer. Thus, the filling period may be several minutes and the draining period a few seconds. Thus, when filling mayonnaise, a filling period of six minutes followed by a draining period of ten seconds, has been found satisfactory. Again, when filling a different substance, a filling period of two minutes and a draining period of ten seconds, proved most suitable. These times, however, are merely illustrative and show what has actually been done in practicing the present invention.

In any given installation, the timer is so constructed or set that the apparatus will fill for the time best suited to the particular substance being, or to be, handled. Likewise with reference to the draining period. In no case should the carry-over of the substance into the vacuum chamber be excessive. Other factors may also enter into the design of the apparatus to meet the particular substance in hand. When a time period for filling is determined, then proper cams 350, 351 and 352 are placed in the timer. In some instances a mere changing in the speed of the timer might suffice. Such means for varying speed are not shown but are well known in the art.

After the filling period has elapsed, and it is time to drain the surplus substance from the vacuum chamber, then the timer opens the contacts 347 and 348, and closes contact 349. Upon this latter event, circuit is completed through the coil 343 of the solenoid valve W to position the valve so as to supply air under pressure to the pipe 246, and thence to the cylinder 241 of the hoisting mechanism N. The circuit for the coil 343 may be traced from conductor 368 through conductor 377, coil 343, conductor 391, closed contact 349 of the timer X, and conductor 367 to conductor 369.

It will be noted that the cams 350, 351 and 352 are shaped so that, at the time the cam 352 closes contact 349, the other two contacts, namely, contacts 347 and 348, are opened. The result of opening contact 347 is to deenergize the winding of switch U' and allow its contact carrying element 339 to drop back against its stop 337, thereby opening the circuit of the motor R. This will stop the rotation of the filling mechanism, with the result that all jars upon the same will be brought to a standstill. Again, the opening of the contact 348, which has control of the valve mechanism Q, will cause the latter to close its valve and cut off the exhaust connection from the vacuum chamber. Thus, the supply of vacuum, if we may so speak, is cut off at the time the rotation of the rotor of the apparatus is stopped. At the same time the hoisting apparatus N is brought into play. This is done by admitting compressed air to the under side of the piston 240 in the cylinder 241 of that apparatus. By such admission, the hoist operates to raise the cover G up out of operative engagement with the tank E. Thus, the vacuum chamber L is disrupted and all surplus substance which has collected therein will be free to flow down over the inclined wall 133 of the supply tank E into that tank. In this service, the draining of the vacuum chamber will occur in a very short time. It is not necessary, therefore, to have the cams upon the timer X arranged for a long period of closure for the contact 349. Thus, as before noted, where the filling period is several minutes, it will suffice to have the draining period measured in seconds.

As soon as the timer X opens the circuit of the coil 343 of the solenoid valve W, then the valve W will connect the under side of the piston 240 of the hoisting mechanism N to atmosphere, and the spring 238 in said mechanism will cause the supporting arm 218 to move downward and bring the chamber forming member G into fitting contact with the main tank E. As before noted, the sealing band K' is of such material that it will keep its shape sufficiently for the lower end of the wall 137 of the member G to pass into it and thus form a tight seal. The other sealing member K will engage the wall 133 at the point where it engages the side wall 122 to form a tight joint at that point, as previously explained.

While the hoisting mechanism N is raising and lowering the cover G, the timer X will continue to advance, and by the time the cover G is again restored to position upon the tank E, the timer will have advanced sufficiently to again close the contacts 347 and 348 and bring about the renewed travel of the apparatus and the filling of jars.

When it is desired to stop the mechanism in the ordinary operation, where there is no overload, then it is only necessary for an attendant to open the circuit of one of the stopping switches T or T'. As soon as such circuit is opened, the winding 336 of switch U will be deenergized as before. This is due to the fact that the switches T and T' are included in series in the locking circuit over conductors 334, 334ᵃ, 334ᵇ and 335, previously traced, and whenever one of these switches is opened, the locking circuit is opened and the switch coil 336 deenergized.

In case the apparatus is stopped when the cover G is in elevated position, then the circuit through coil 343 of valve W will be broken and as a result the valve will restore its atmospheric connection to the under side of the piston 240 and the hoist N will then promptly lower the cover G to its place upon the tank E.

Turning to the filling operations of the apparatus, we find them similar in general to the filling operations of the aforesaid patents. During part of each rotation of the carrier C, the lifters D rise and remain elevated, thereby pressing the jars M into sealing engagement with the heads H. At such times, the jars are being filled. During the balance of the rotary travel of the carrier the lifters drop down and occupy their lower positions, and it is during this latter period that empty jars are received upon the lifters and filled jars are delivered from them. The control of these movements is brought about by supplying and cutting off the supply of compressed air. This is done by the ports 118 associated with the lifters D. As they travel along, they cooperate with the different segments of the groove 80 formed in the upper surface of the ring 40 of the bearing A', as before pointed out. These different ports 118 and the cooperating bearing ring thus act as valves to control the supply of the actuating compressed air. This action is all independent of the timer X, except that when the latter operates to stop the motor R, the air supply condition, in the case of any particular head H, remains unchanged until the motor R again starts the rotor. When the latter begins its travel, then the receiving, filling and delivering operations continue as before. From this it will be seen that the hoisting of the cover G for the purpose of draining the carried-over substance from the vacuum chamber L, does not in any way interfere with the intended functioning of the several lifters and the other parts which cooperate therewith in the filling of the jars.

From the description thus far given, it will be seen that the various parts of the apparatus which come in contact with the mayonnaise or other substance may be readily separated for cleaning purposes. Thus, beginning at the top of the apparatus, any pipe which supplies mayonnaise to the upper end of the pipe J, may be unthreaded from the latter, and moved out of the way. Then, the cover G may be lifted free of the tank E and the pipe J. In order to accomplish this, the ring structure of the hoist N must be opened up, as it can be by withdrawing the pin 217 and separating the parts 213 and 214 of the ring structure. When removed from the other parts, the cover G may be thoroughly cleaned.

When the cover G is removed, then the air collecting pipe 135 may be withdrawn by removing the sleeve 138 of that pipe from the vertical vacuum pipe 130. Then the air collecting pipe may be cleaned both inside and outside, access to the inside being had through the slot or succession of slots 136.

With the air collecting pipe 135 removed, then each of the cups 187 with its connecting pipe 186 may be removed and cleaned. This is possible because the lower end of each pipe 186 is removably fitted over the upper end of the pipe 185 which forms part of the head H in each case.

When the cover G has been removed, then the pipe J with the attached float F may be lifted bodily from the tank E. When this is done, the removed members may be thoroughly cleansed and especially those parts which engage the substance within the tank E during operation. The float F may be readily removed from the distributing pipe J by unscrewing the cap 204 from the lower end of the pipe J. When this cap is removed, then the float F with its valve element may be readily freed from the pipe J with its valve element.

When these various parts are removed from the tank E, then the latter, together with the ends of the pipe 153 which project into it, may be thoroughly cleaned.

The heads H are also constructed so that their interior passages may be thoroughly cleaned. Thus, the vacuum passage 178 is a straight line passage down to the nozzle 171. By removing the petticoat ring 191 from the end of the nozzle, the nozzle itself may be readily withdrawn from the head 170 by unscrewing the coupling 172. The cushion 193 may also be withdrawn from the ring 191. When the parts are thus separated, the supply passage 176 within the head and the interior of the supply pipe 153 may in each case be thoroughly swabbed out. The removal of the plug 183 with the associated air pipe H' also enables these parts to be thoroughly cleaned.

Before concluding the present disclosure, it may be well to illustrate, by a simple diagram, how suitable pressure differentials for operating the apparatus and carrying out the method may be obtained. In this connection it may be well to indicate also in the diagram, how the air or gas bubbles pass up through the substance supply passage in the carrying out of the method.

Accordingly, in Fig. 21 we have shown a supply tank $a$ in which the substance $b$ is located. The lower portion of this tank is connected by supply pipe $c$ to a filling head $d$. The head $d$ is also connected by a pipe $e$ with a chamber $f$. A pipe $g$ communicates at one end with the upper portion of the tank $a$, and at its lower end, it terminates within the pipe $c$. The head $d$ is a filling head and a jar M is shown pressed up against the same in position to be filled. The substance is supplied to the tank $a$ through a pipe 393 which is controlled by a valve 394. An air supply pipe 395, controlled by a valve 396, is also provided for admitting air or the like to the tank $a$. The supply pipe $c$ and the delivery pipe $e$ are controlled, respectively, by valves 397 and 398. A valve 399 controls the continuity of the air pipe $g$. The tank $f$ is provided with a pipe 400 which is controlled by valve 401. The pipe 400 is intended for connection to a pump or other means for providing the proper pressure within the tank $f$. The tank $f$ is also provided with a drain pipe 402 which is controlled by a valve 403.

Now, in practice, there are several ways in which the apparatus of this diagram may be used. In other words, there are different ways in which the differential pressures for filling the jar M may be obtained.

If the way relied upon is the same as that heretofore described in connection with the full commercial apparatus, then the air within tank $f$ would be at sub-atmospheric pressure, while that in the tank $a$ would be at atmospheric pressure. Following out the operation with the differentials thus provided by atmospheric and sub-atmospheric pressures, we first would supply the tank $a$ with the substance $b$ up to the desired level. This might be done by passing the substance through the pipe 393. In such case, the valve 396 would be left open to atmosphere and thus the air in the tank above the substance $b$ would be at atmospheric pressure. On the other hand, the tank $f$ would have its pipe 400 connected to a vacuum pump or the like, and the pressure of the air within the tank $f$ would be below that of atmosphere. Using the language heretofore employed, the tank $f$ would be supplied with vacuum. If, then, the valve 398 be opened, the air pressure within the jar M will be brought to the same point as the air pressure in the tank $f$. This will be a sub-atmospheric pressure. If, following this, the valve 397 be opened, then the atmospheric pressure in the tank $a$, being greater than the sub-atmospheric pressure in the jar M, will cause the substance $b$ to travel through the pipe $c$ into the jar M. Now, in accordance with the present invention, which is intended to handle the heavier viscous substances, the substance in its passage through the pipe $c$ is to be assisted by air admitted through the pipe $g$ into the stream of flowing substance. This supply of air is controlled by valve 399. The latter may be opened more or less to regulate the flow of air from atmosphere into the stream of substance which is under the action of the pressure differentials.

When the jar M is filled, then the valve 398 may be closed or the sub-atmospheric influence removed in some other way, as, for instance, by withdrawing the jar M from the head $d$. Then a new jar M is put in place against the head $d$ so as to seal off the connection, and the operation is repeated.

But, instead of having the air pressure in tank $a$ at the pressure of atmosphere and the pressure of the air in tank $f$ at a lower pressure, the differentials may be otherwise established. Thus, if the tank $a$ be supplied with the substance as before, then air under pressure may be supplied to the same tank through pipe 395 connected with a suitable source of compressed air, the valve 396 being maintained open while the pressure is being built up or maintained. In order to keep the pressure in the upper part of the tank $a$ at the desired point, of course, the supply valve 394 must be closed after supplying the substance through the pipe 393. At this time, the valves 397 and 399 will be closed. Up to this point, then, there is a built up pressure in the tank $a$. For convenience in this discussion we may call this the "high" pressure.

Now, in the tank $f$ the pressure may be that of atmosphere, or below atmosphere, or above atmosphere, provided that it is lower than the "high" pressure in tank $a$. For convenience we may call this pressure in the tank $f$ the "low" pressure. To give the matter definite mathematical form, it may be assumed that the high pressure is 20 pounds per square inch and the low pressure 10 pounds per square inch. In operation, then, the opening of valve 398 will place the pressures in jar M and tank $f$ at the same point, namely, substantially, the "low" pressure of the tank $f$. Then, upon opening the valve 397, there will be the differential between the "high" and the "low" pressures which will operate to force the substances through the pipe $c$ into the jar M. In the assumed mathematical case, this differential will be 10 pounds per square inch. At the same time, the opening of valve 399 will admit air from the "high" pressure supply and direct it into this stream of substance flowing through the pipe $c$. When the jar M is filled, then the operation will be practically as before. The jar M will be removed from the head $d$ and a new one put in its place. The valves 397 and 398 may be operated to make it easier to remove the jar M, as will be obvious.

Now, it will also be apparent that, although air has been referred to as the medium above the substance $b$ in the tank $a$, and also the medium in the tank $f$, it may be desirable in some instances, and the operation would be the same, if in lieu of air under pressure, as 20 pounds, in tank $a$, and air under pressure, as 10 pounds, in tank $f$, to employ other gaseous mixtures. This could be brought about by supplying a suitable gas through pipe 395 in lieu of the air under pressure previously considered. The tank $f$ would not need to be supplied with a gas or gaseous mixture other than air, but, by reason of operation of the equipment, the fluid collected in the tank $f$ would be a mixture of air and the gaseous mixture of tank $a$.

In case any surplus of substance is carried over into the tank $f$, then, by closing valve 401 and opening valve 403, the tank may be drained. This could be done when there is no jar in place and air at atmospheric pressure would thus be free to enter the top of the tank $f$ as the overflow substance passed out through the pipe 402.

From this consideration of the diagram of Fig. 21, it is clear that in carrying out the process, the stream of substance on its way to the vessel to be filled, may have injected into it a more or less pure gas or a definite gas mixture. Of course, in ordinary practice, air is the gas mixture which is thus injected. It will also be noted that the terminating of the air pipe within the supply pipe up from its lower end, brings about a difference of pressure which difference acts upon the air in the air tube to deliver it in more or less small quantities into the flowing stream of the substance. In the diagram, these quantities of air or gas are represented by small circles, designated 404, which are referred to elsewhere herein as globules or bubbles. These will not be as large as indicated in the diagram, but will be numerous and relatively small, although varying in size according to the conditions of the substance and the various pressures. The illustration of these globules 404 in the diagram of Fig. 21, is itself diagrammatic and not intended to convey any idea of the exact sizes of the air or gas masses which pass into the flowing substance. Neither do these diagrammatically represented globules indicate any definite arrangement of the masses. Obviously, too, the control valve 388 might be alternately opened and closed. This might be done by hand or by suitable mechanism. Such intermittent operation would, of course, give a different distribution of the globules. They would then come in groups, one group followed by another after an interval of time. In handling some substances this way might have advantages and be preferred.

It should be noted also that where the substance is spread out as it enters the container, as by the cone 180, the spread out stream of mingled substance and gas is directed toward the container walls and then, when the gas explodes, it explodes near the walls and thus complete filling is obtained. In other words, the directed spread of impregnated substance is toward the outer walls of the container and consequently the driving forces of the exploding or expanding gas particles or masses will act near the containers' outer walls and so insure good filling.

From the foregoing, it will be seen that the fundamental idea we have made use of in the present invention is to produce in the traveling stream of product, a stream of bubbles of air, or the like, mixed with the product, whereby when the bubbles get near to, or arrive at, the nozzle opening, they explode and thereby successively drive small amounts of the product ahead of them into the container. This explosive action packs the product tightly into the container, a condition which is not possible when handling heavy mayonnaise and salad dressings in vacuum filling according to the practices of the prior art. By the use of this principle, we are enabled to get the advantages of a vacuum filler in handling these heavy products, which heretofore have been handled only upon apparatus employing piston action, to feed the product.

In connection with the location of the air inlet within the stream of product, we find that by changing the point of admission we can regulate the proportion of air to the product. The higher we place the air vent in the substance supply tube, the more the air that is admitted, and vice versa. The dimensional proportions indicated in the drawings, furnish ideal conditions for the general run of mayonnaise, salad dressings and cottage cheese. With other products the setting may be different, but this can be readily determined by a few tests. In any event the principle remains the same.

Since the method may be employed by the use of more or less pure gas, air or other gaseous mixtures, we have employed the term "gas" in the claims in a generic sense in order to cover these different media.

It may also be pointed out that where operating with pressure differentials obtained by atmospheric pressure on the one hand and sub-atmospheric pressure (vacuum) on the other hand, the degree of sub-atmospheric pressure may be varied. Thus, in operating apparatus of the kind herein disclosed, with mayonnaise, we have commonly employed a vacuum represented by about 18 inches of mercury. In handling salad dressings of a different consistency, such as "Miracle Whip," a vacuum represented by 16 inches was sufficient. Again, with substances like sandwich spreads and thousand island dressing, a vacuum represented by 12 inches sufficed.

We have noted that the amount of air drawn into the product falls off in about the same proportion as the vacuum is reduced, and the lowering of the vacuum for thinner products, keeps the speed of filling for all products about the same.

With reference to the operation of the apparatus, it may be pointed out that the filling periods and the drain-back periods may be varied, as before noted.

It may also be pointed out that in order to keep the production line operating steadily, the filling apparatus is run a few jars per minute faster than the rest of the line, and in this way a sufficient number of jars accumulates on the conveyer to insure steady operation of the entire equipment.

When constructing the various parts of the apparatus, metal should be used except where otherwise noted. Preferably, where the substance being handled is mayonnaise or the like, the various parts which engage the same are composed of stainless steel or other metal suited to the substance. In some instances chromium metal finish may suffice. It is important to have metals which will not spoil the taste of the product in case the latter is an edible substance.

Likewise it should be kept in mind that the differences in size of containers, differences in speed of rotation, differences in the size of the air supply tubes, pressure differentials and the like are important. Thus, many different arrangements and operations may be employed, depending upon the conditions of service and the judgment of the maker of the apparatus.

Obviously, then, in putting our invention into practice, many changes and alterations may be made in the details and uses disclosed. Because of these facts, we do not wish to be unduly limited in respect to our claims, but aim to cover by their terms all of those alterations and modifications which rightly come within the spirit and the scope of the invention.

We claim:

1. In apparatus of the class described, the combination of a filling head having a cushioning nozzle adapted to seal the mouth of the vessel being filled, a vacuum chamber, vacuum connections through which said vacuum chamber may be evacuated, a viscous substance supply chamber for holding the substance at a level below that of said head, said head being provided with continuously open vacuum and substance passages communicating with said vacuum and supply chambers respectively and terminating in vacuum and supply ports adapted to enter the open mouth of the vessel to be filled, said parts cooperating to fill the vessel by the production of vacuum therein, said substance passage including a rectilinear portion open at its top, a plug for closing said open top, and an air pipe passing through said plug and terminating within the said rectilinear portion of said substance passage to place the same in direct communication with atmosphere, whereby the advancing stream of viscous substance is aerified as it approaches said head.

2. In apparatus of the class described, the combination of a filling head having a cushioning nozzle adapted to seal the mouth of the vessel to be filled, a vacuum chamber, connections through which said chamber may be evacuated, a supply chamber for holding the viscous substance, the level of the latter being below that of said head, said head having a depending nozzle having a straight axial vacuum passage and a straight substance outlet passage terminating in adjacent ports in the lower face of said nozzle, said head having also an inclined supply passage positioned at one side of the axis of said vacuum passage, said inclined supply passage also being straight, open at its top and, adjacent thereto, communicating with said substance outlet passage, and at its lower end terminating below the level of the viscous substance in said supply chamber, a plug for closing said top, and an air pipe passing through said plug and terminating within said tubular portion to supply air to the advancing stream of viscous substance, to aerify the same on its way to the vessel being filled.

3. In apparatus of the class described, the combination of a supply holder, chamber walls associated with said holder and forming therewith a a vacuum chamber, vacuum connections through which said vacuum chamber when so formed may be evacuated, a filling head against which a vessel may be held for filling, communicating passages between said head and vacuum chamber and said head and holder whereby a liquid may be drawn into said vessel from said holder and surplus liquid carried over into said vacuum chamber, and means for moving said chamber walls to disassemble said vacuum chamber to allow the surplus liquid previously collected therein to pass into said holder under the action of gravity.

4. In apparatus of the class described, the combination of a supply holder, chamber walls associated with said holder and forming therewith a vacuum chamber, vacuum connections through which said vacuum chamber when so formed may be evacuated, a filling head against which a vessel may be held for filling, communicating passages between said head and vacuum chamber and said head and holder whereby a liquid may be drawn into said vessel from said holder and surplus liquid carried over into said vacuum chamber, means for moving said chamber walls to disassemble said vacuum chamber to allow of the emptying thereof, and control means for said vacuum connections and said moving means operative to successively cut off the vacuum supply and then move said chamber walls into disassemblage.

5. In apparatus of the class described, the combination of a supply holder, chamber walls associated with said holder and forming therewith a vacuum chamber, vacuum connections through which said vacuum chamber when so formed may be evacuated, a filling head against which a vessel may be held for filling, communicating passages between said head and vacuum chamber and said head and holder whereby a liquid may be drawn into said vessel from said holder and surplus liquid carried over into said vacuum chamber, means for moving said chamber walls to disassemble said vacuum chamber to allow of the emptying thereof, and control means for said vacuum connections and said moving means operative to open and close said evacuating connections and to shift said moving means to and fro in proper timed relation to the opening and closing of said evacuating connections.

6. In apparatus of the class described, the combination of a supply holder having a peripheral wall having a portion extending upward and outward, chamber walls cooperating with said inclined portion to form a vacuum chamber from which flowable substances will pass into said holder when said chamber walls are raised from said peripheral wall, vacuum connections through which said chamber may be evacuated, a filling head against which a vessel may be held for filling, communicating passages between said head and vacuum chamber and between said head and holder whereby substance may be drawn from said holder by suction to fill said vessel and surplus substance will be carried on into said vacuum chamber, and means for raising said chamber walls to substance discharging position and for lowering them to vacuum chamber forming position.

7. In apparatus of the class described, the combination of a supply holder having a peripheral wall having a portion extending upward and outward, chamber walls cooperating with said inclined portion to form a vacuum chamber from which flowable substances will pass into said holder when said chamber walls are raised from said peripheral wall, vacuum connections through which said chamber may be evacuated, a filling head against which a vessel may be held for filling, communicating passages between said head and vacuum chamber and between said head and holder whereby substance may be drawn from said holder by suction to fill said vessel and surplus substance will be carried on into said vacuum chamber, hoisting mechanism for raising and lowering said chamber walls, control means for operating said hoist at regular intervals, and control means for said vacuum connections operative to establish vacuum in, and cut off vacuum from, said vacuum chamber in timed relation to the raising and lowering of said chamber walls.

8. Vessel filling apparatus comprising a fixed support, a liquid supply chamber mounted upon said fixed support and provided with an annular series of filler heads, each of said filler heads comprising a temporary vessel closure having liquid and vacuum passages and ports therein, said liquid supply chamber being mounted to rotate upon said fixed support and being arranged to operate at atmospheric pressure, an upper supplemental member having walls cooperating with the walls of said supply chamber to form a vacuum chamber, said supplemental member being movable away from said supply chamber to allow material which may have accumulated in said vacuum chamber to pass down into said supply chamber, a supply pipe leading to said supply chamber and provided with a float valve to maintain a predetermined liquid level in said supply chamber below the level of said filler heads, duct means providing communication between the vacuum ports of said heads and the vacuum chamber, duct means providing communication between the liquid ports of said heads and the interior of said supply chamber at points below the level of the substance therein, and means for raising and lowering said supplemental member to bring it into discharging and vacuum-chamber-forming positions.

9. In apparatus of the class described, the combination of a tank for holding the supply substance, said tank having an outwardly and upwardly inclined upper wall portion and an open top, an upper supplemental member having downwardly extending walls adapted to engage said tank wall to form therewith an annular vacuum chamber, vacuum connections for use in evacuating said chamber, means for utilizing the vacuum produced in said chamber to withdraw substance from said supply tank to fill vessels and to draw surplus substance into said vacuum chamber, said tank and supplemental member being separable to allow the surplus substance to flow by gravity into said tank, and the supplemental member having its chamber forming walls far enough apart to permit the interior of said member to be thoroughly scrubbed and cleaned.

10. Vessel filling apparatus comprising a fixed support, a tank for holding the supply substance, said tank being rotatably mounted on said support and having an outwardly and upwardly inclined upper wall portion and an open top, an annular series of filler heads outward of said tank, an upper supplemental member having walls forming an inverted open annular trough adapted to engage the upper portion of the wall of said tank to form therewith an annular vacuum chamber located at a level above that of said heads, vacuum connections through which said chamber may be evacuated, conduit means associated with said heads for utilizing the vacuum produced in said chamber to withdraw supply substance from said supply tank to fill vessels pressed against said heads and to draw surplus substance into said vacuum chamber, said tank and supplemental member being separable to allow any surplus substance drawn into said vacuum chamber to be discharged into said tank, said tank being readily cleanable by reason of its open top and said supplemental member having its trough forming walls far enough apart to permit the interior of the inverted trough thereof to be thoroughly and easily cleaned.

11. In apparatus of the class described, the combination of a supply tank having an outwardly flaring top, a supplemental member having depending walls adapted to fit said top, means for raising and lowering said member into open and closed positions, said tank and member in the closed position of the latter forming a vacuum chamber and in the open position permitting the discharge of a flowable substance in said chamber into said supply tank, vacuum connections through which said vacuum chamber when formed may be evacuated, and means for utilizing the vacuum in said chamber to fill vessels by producing a vacuum in them and to draw excess substance into said chamber.

12. In apparatus of the class described, the combination of a supply tank having an outwardly flaring top, a supplemental member having depending walls adapted to fit said top, means for raising and lowering said member into open and closed positions, said tank and member in the closed position of the latter forming a vacuum chamber and in the open position permitting the discharge of a flowable substance in said chamber into said supply tank, vacuum connections through which said vacuum chamber when formed may be evacuated, means for utilizing the vacuum in said chamber to fill vessels by producing a vacuum in them and to draw excess substance into said chamber, means for closing said evacuating connections, an electric motor for rotating said tank and supplemental member, and control means for said motor, closing means and said raising and lowering means, operative to drive said motor through definite periods with intervening quiescent intervals, and then during a quiescent interval of said motor to cut off the vacuum from said chamber and then raise and lower said supplemental member.

13. In apparatus of the class described, the combination of a supply tank having an outwardly flaring top, a supplemental member having depending walls adapted to fit said top, means for raising and lowering said member into open and closed positions, said tank and member in the closed position of the latter forming a vacuum chamber and in the open position permitting the discharge of a flowable substance in said chamber into said supply tank, vacuum connections through which said vacuum chamber when formed may be evacuated, means for utilizing the vacuum in said chamber to fill vessels by producing a vacuum in them and to draw excess substance into said chamber, means for closing said evacuating connections, an electric motor for rotating said tank and supplemental member, fluid pressure means for actuating said raising and lowering means, electromagnetic means for controlling said fluid pressure means, an electromagnetically operated switch for controlling said electric motor, and a timing device for controlling said electromagnetic means, said closing means and said switch to bring about stoppages of said motor at intervals during which intervals the vacuum is cut off and said supplemental member is raised and lowered.

14. In apparatus of the class described, the combination of a lower supply tank, a chamber-forming member fitting upon and separable from said tank, said tank and member when together providing a vacuum chamber and when separated disrupting said vacuum chamber, vacuum connections through which said vacuum chamber when formed may be evacuated, means for utilizing the vacuum in said chamber both to fill vessels by producing a vacuum in them and to draw excess filling substance into said chamber, means for moving said tank and member relatively to form and disrupt said vacuum chamber, means for rotating said tank and member, means for breaking the vacuum in said chamber independently of separating said tank and member, and control means for said moving means, said vacuum breaking means and said rotating means, the same being operative to break said vacuum and disrupt said vacuum chamber by separating said tank and member but only when said tank and member are not rotating.

15. In apparatus of the class described, the combination of a lower supply tank, a chamber-forming member fitting upon and separable from said tank, said tank and member when together providing a vacuum chamber and when separated disrupting said vacuum chamber, vacuum connections through which said vacuum chamber when formed may be evacuated, means for utilizing the vacuum in said chamber both to fill vessels by producing a vacuum in them and to draw excess filling substance into said chamber, an electric motor and gearing for rotating said tank and member, means for breaking the vacuum in said chamber independently of separating said tank and member, means for moving said tank and member relatively to form and disrupt said vacuum chamber, and timing means for controlling said electric motor, said vacuum breaking means and said moving means to intermittently rotate said tank and member and during quiescent intervals to break said vacuum and to disrupt the vacuum chamber.

16. In apparatus of the class described, the combination of a filling head having a nozzle adapted to cooperate with the mouth of a vessel to be filled, a vacuum chamber, vacuum connections whereby said chamber may be evacuated, a supply chamber for holding a liquid at a level below said head, said head being provided with continuously open vacuum and liquid passages communicating with said vacuum and supply chambers respectively and terminating in vacuum and supply ports adapted to register with the mouth of the vessel to be filled, said parts operating to fill the vessel by producing a vacuum therein, said nozzle having a substantially horizontal terminal face, an outer skirt extending outward and then downward from said head, starting at a point above said terminal face and forming an annular space around said terminal face, said skirt also extending below said terminal face, and a soft cushion filling said annular space and extending below said terminal face, said skirt and cushion having a series of communicating openings in a horizontal plane below and adjacent to said terminal face.

17. In apparatus of the class described, the combination of a filling head having a nozzle adapted to cooperate with the mouth of a vessel to be filled, a vacuum chamber, vacuum connections whereby said chamber may be evacuated, a supply chamber for holding a liquid at a level below said head, said head being provided with continuously open vacuum and liquid passages communicating with said vacuum and supply chambers respectively and terminating in vacuum and supply ports adapted to register with the mouth of the vessel to be filled, said parts operating to fill the vessel by producing a vacuum therein, said nozzle having a substantially horizontal terminal face, an outer skirt extending outward and then downward from said head, starting at a point above said terminal face and forming an annular space around said terminal face, and a soft cushion filling said annular space and extending below the terminal face of said extended end, said cushion having a series of lateral openings in a horizontal plane below and adjacent to said terminal face.

18. In apparatus of the class described, the combination of a filling head having a nozzle adapted to cooperate with the mouth of a vessel to be filled, a vacuum chamber, means for evacuating said chamber, a supply chamber for holding a viscous flowable substance, the level of said substance being below that of said head, said head being provided with continuously open vacuum and substance passages communicating with said vacuum and supply chambers respectively and terminating in vacuum and supply ports adapted to operatively register with the mouth of the vessel to be filled, said parts operating to fill the vessel by producing a vacuum therein, said nozzle having a substantially horizontal terminal face, a spreading cone in said supply port, the base of said cone being in the plane of said terminal face and the apex of the cone extending upward within said port, means for supporting said cone in said position, a skirt surrounding and spaced from said nozzle, and a soft cushion filling said annular space formed between said nozzle and skirt, said skirt and cushion having a series of lateral openings lying in a horizontal plane.

19. In apparatus of the class described, the combination of a filling head having a nozzle adapted to cooperate with the mouth of a vessel to be filled, a vacuum chamber, means for evacuating said chamber, a supply chamber for holding a viscous flowable substance, the level of said substance being below that of said head, said head being provided with continuously open vacuum and substance passages communicating with said vacuum and supply chambers respectively and terminating in vacuum and supply ports adapted to operatively register with the mouth of the vessel to be filled, said parts operating to fill the vessel by producing a vacuum therein, said nozzle having a substantially horizontal terminal face, a spreading cone in said supply port, the base of said cone being in the plane of said terminal face and the apex of the cone extending upward within said port, means for supporting said cone in said position, a skirt surrounding and spaced from said nozzle, and a soft cushion filling said annular space formed between said nozzle end and skirt and extending below said terminal face, said skirt and cushion having a series of lateral openings in a horizontal plane just below said horizontal terminal face.

20. In apparatus of the class described, the combination of a supply tank, a supplemental member adapted to fit upon said tank to form an annular vacuum chamber, a vacuum pipe extending upward into said chamber, an air collecting tube in said vacuum chamber formed with a downwardly extending sleeve adapted to fit upon the upper end of said vacuum pipe and form with the same a continuous passage for the supply of vacuum to said vacuum chamber.

21. In apparatus of the class described, the combination of a supply tank having an outwardly flaring top, a supplemental member having depending walls adapted to fit said top, means for raising and lowering said member into open and closed positions, said tank and member in the closed position of the latter forming an annular vacuum chamber and in the open position permitting the discharge of a flowable substance in said chamber into said supply tank, a vacuum pipe extending upward into said chamber, an air collecting tubular ring in said chamber extending around the same and being removably secured upon and in communication with said vacuum pipe, connections whereby air may be drawn from said chamber through said ring and pipe to evacuate said chamber, and means for utilizing the vacuum in said chamber to fill containers by producing vacuum in them and drawing surplus substance into said vacuum chamber.

22. In apparatus of the class described, the combination of an annular vacuum chamber made up of separable parts, a series of filling heads arranged in a ring directly beneath said chamber when formed, each said head having vacuum and supply passages and ports, said vacuum passages opening into said chamber through its bottom, a series of extension tubes, one for each said vacuum passage, removably mounted in said chamber and each communicating with its associated vacuum passage, an inverted cup above the outer end of each of said extension tubes, said cups serving to separate air from any carried over substance, a slotted air collecting tube above said cups in said chamber, and connections through which air may be drawn from said chamber through the slots in said tube.

23. In apparatus of the class described, the combination of a lower supply tank having a laterally extending wall, a chamber-forming member having depending walls adapted to fit upon said tank, the fitting at one point at least occurring at a low point of the chamber formed when said tank and member are fitted together, means for raising and lowering said member into open and closed positions, said tank and member in closed position forming said chamber and in open position permitting the discharge of any flowable substance from said chamber into said tank, vacuum connections through which said vacuum chamber when formed may be evacuated, and means for utilizing the vacuum in said chamber both to fill vessels by producing a vacuum in them and to draw excess filling substance into said chamber.

24. In apparatus of the class described, the combination of a filling head having a nozzle adapted to cooperate with the mouth of a vessel to be filled, a vacuum chamber, means for evacuating said chamber, a supply chamber for holding a viscous flowable substance, the level of said substance being below that of said head, said head being provided with continuously open vacuum and substance passages communicating with said vacuum and supply chambers respectively and terminating in vacuum and supply ports adapted to operatively register with the mouth of the vessel to be filled, said parts operating to fill the vessel by producing a vacuum therein, said nozzle having a substantially horizontal terminal face, an outer skirt extending outward and downward from said head, starting at a point above said terminal face and forming an annular space around said terminal face, said skirt also extending below said terminal face, and a soft cushion filling said annular space, said skirt and cushion having a series of communicating openings in a horizontal plane.

25. In apparatus of the class described, the combination of a filling head having a nozzle adapted to cooperate with the mouth of a vessel to be filled, a vacuum chamber, means for evacuating said chamber, a supply chamber for holding a viscous flowable substance, the level of said substance being below that of said head, said head being provided with continuously open vaccum and substance passages communicating with said vacuum and supply chambers respectively and terminating in vacuum and supply ports adapted to operatively register with the mouth of the vessel to be filled, said parts operating to fill the vessel by producing a vacuum therein, said nozzle having a substantially horizontal terminal face, an outer skirt extending outward and then downward from said head, starting at a point above said terminal face and forming an annular space around said terminal face, and a soft cushion filling said annular space, said cushion having a series of openings lying in a horizontal plane.

26. In apparatus of the class described, the combination of a filling head having a nozzle adapted to cooperate with the mouth of a vessel to be filled, a vacuum chamber, means for evacuating said chamber, a supply chamber for holding a viscous flowable substance, the level of said substance being below that of said head, said head being provided with continuously open vacuum and substance passages communicating with said vacuum and supply chambers respectively and terminating in vacuum and supply ports adapted to operatively register with the mouth of the vessel to be filled, said parts operating to fill the vessel by producing a vacuum therein, said nozzle having a substantially horizontal terminal face, an outer skirt extending outward and downward from the head to form an annular space, and a cushioning member adapted to seal the mouth of the vessel pressed upon, comprising an upper portion seated in said space, a lower portion within said skirt, and intervening openings, whereby when the vessel is pressed upward, the slight amount of material between the openings gives way to close communication between the interior of the vessel and atmosphere and when said pressure is removed said material expands to restore said openings.

27. In apparatus of the class described, the combination of a filling head having a nozzle adapted to cooperate with the mouth of a vessel to be filled, a vacuum chamber, means for evacuating said chamber, a supply chamber for holding a viscous flowable substance, the level of said substance being below that of said head, said head being provided with continuously open vacuum and substance passages communicating with said vacuum and supply chambers respectively and terminating in vacuum and supply ports adapted to operatively register with the mouth of the vessel to be filled, said parts operating to fill the vessel by producing a vacuum therein, said nozzle having a substantially horizontal terminal face, an outer skirt extending outward and downward from the head to form an annular space, and a cushioning member adapted to seal the mouth of the vessel pressed upon, comprising an upper portion seated in said space, a lower portion within said skirt, and intervening communicating passages extending radially therethrough, whereby when the vessel is pressed upward, the slight amount of material between the openings gives way to close communication between the interior of the vessel and atmosphere and when said pressure is removed said material expands to restore said openings.

ALBERT B. MOJONNIER.
MALCOLM MILLER.